(12) United States Patent
Zhou et al.

(10) Patent No.: US 12,451,563 B2
(45) Date of Patent: Oct. 21, 2025

(54) SEGMENT MEMBRANE, BATTERY COMBINATION, AND ELECTRICAL DEVICE

(71) Applicant: HUAWEI TECHNOLOGIES CO., LTD., Guangdong (CN)

(72) Inventors: Wei Zhou, Shenzhen (CN); Huihui Zhou, Shenzhen (CN); Yaoming Deng, Shenzhen (CN); Yangxing Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 753 days.

(21) Appl. No.: 17/826,875

(22) Filed: May 27, 2022

(65) Prior Publication Data

US 2022/0294083 A1    Sep. 15, 2022

Related U.S. Application Data

(63) Continuation of application No. PCT/CN2020/098616, filed on Jun. 28, 2020.

(30) Foreign Application Priority Data

Nov. 30, 2019    (CN) .......................... 201911208846.3

(51) Int. Cl.
*H01M 50/477*    (2021.01)
*H01M 50/569*    (2021.01)

(52) U.S. Cl.
CPC ....... *H01M 50/477* (2021.01); *H01M 50/569* (2021.01)

(58) Field of Classification Search
CPC .......................... H01M 50/477; H01M 50/569
See application file for complete search history.

(56) References Cited

U.S. PATENT DOCUMENTS

| | | |
|---|---|---|
| 9,142,811 B2 | 9/2015 | Chami |
| 10,044,077 B2 | 8/2018 | Callahan et al. |
| | (Continued) | |

FOREIGN PATENT DOCUMENTS

| | | |
|---|---|---|
| CN | 101048888 A | 10/2007 |
| CN | 101719562 A | 6/2010 |
| | (Continued) | |

OTHER PUBLICATIONS

Translation CN102104167 (Year: 2011).*

(Continued)

*Primary Examiner* — Jane J Rhee
(74) *Attorney, Agent, or Firm* — Fish & Richardson P.C.

(57) ABSTRACT

This application provides example segment membranes, example battery combinations, and example electrical devices. One example segment membrane includes a conductive layer, a first insulation layer, and a second insulation layer that are disposed in a laminated manner, where the conductive layer is located between the first insulation layer and the second insulation layer. The conductive layer includes a first conductive part and a second conductive part that are disposed in a laminated manner and electrically connected. The first insulation layer is a first frame structure, and the first insulation layer is disposed on a surface that is of the first conductive part and that is away from the second conductive part. The second insulation layer is a second frame structure, and the second insulation layer is disposed on a surface that is of the second conductive part and that is away from the first conductive part.

20 Claims, 29 Drawing Sheets

(56) References Cited

U.S. PATENT DOCUMENTS

2002/0064708 A1* 5/2002 Asahina ................ H01M 50/26
429/185
2012/0028094 A1* 2/2012 Kim .................... H01M 50/209
429/99

FOREIGN PATENT DOCUMENTS

| CN | 102104167 A | 6/2011 |
|---|---|---|
| CN | 102292845 A | 12/2011 |
| CN | 102549808 A | 7/2012 |
| CN | 102668225 A | 9/2012 |
| CN | 103219521 A | 7/2013 |
| CN | 103268928 A | 8/2013 |
| CN | 103843166 A | 6/2014 |
| CN | 104577132 A | 4/2015 |
| CN | 105009353 A | 10/2015 |
| CN | 107240721 A | 10/2017 |
| CN | 110518174 A | 11/2019 |
| JP | 2002231300 A | 8/2002 |
| JP | 2007172943 A | 7/2007 |
| JP | 2019053891 A | 4/2019 |
| WO | 2019160232 A1 | 8/2019 |

OTHER PUBLICATIONS

Office Action in Japanese Appln. No. 2022-531501, mailed on Jul. 18, 2023, 4 pages (with English translation).
Extended European Search Report in European Appln. No. 20892454.8, mailed on Feb. 28, 2024, 6 pages.
Office Action issued in Chinese Application No. 201911208846.3 on Nov. 15, 2021, 15 pages (with English translation).
PCT International Search Report and Written Opinion issued in International Application No. PCT/CN2020/098616 on Sep. 1, 2020, 17 pages (with English translation).

* cited by examiner

SEGMENT MEMBRANE, BATTERY COMBINATION, AND ELECTRICAL DEVICE

CROSS-REFERENCE TO RELATED APPLICATIONS

This application is a continuation of International Application No. PCT/CN2020/098616, filed on Jun. 28, 2020, which claims priority to Chinese Patent Application No. 201911208846.3, filed on Nov. 30, 2019. The disclosures of the aforementioned applications are hereby incorporated by reference in their entireties.

TECHNICAL FIELD

This application relates to the field of battery technologies, and in particular, to a segment membrane, a battery combination, and an electrical device.

BACKGROUND

Batteries have brought tremendous changes to people's lives since the batteries came out. From small portable electronic devices (for example, a smartphone, a smartwatch, a tablet computer, and a notebook computer) to large mobile devices (for example, an electric automobile, an electric truck, and an electric ship), all rely on energy provided by the batteries. However, different application scenarios have different requirements on battery capacity voltages, and a single cell usually operates in a series and/or parallel manner.

For example, in the electric automobile, the electric truck, and the electric ship, because electricity required in these scenarios may reach tens to hundreds of KWh, and voltages required in these scenarios often reach several hundreds to one thousand of volts, several single cells are first connected in parallel to reach a specific capacity, and then connected in series to increase a total voltage of a battery group.

In the tablet computer and the notebook computer, because operating voltages of these devices are tens of volts, single cells are connected in series to reach high voltages. In a smartphone field, parallel batteries (Apple 8 uses two parallel batteries for power supply) and serial batteries (OPPO fast charging technology) also came out due to requirements for endurance time and fast charging.

However, currently, single cells are connected in series and/or parallel by using an external electrical connector to connect cathodes and anodes of the single cells. For example, in a power battery, single cells are connected by using a bolt and a conductive sheet. In a digital battery, single cells are connected through an external wire. In this serial and/or parallel manner, volume and mass occupied by package materials and connectors in an entire battery group or a battery system are large, thereby reducing a volume energy density and a mass energy density of the entire battery group or the battery system, and affecting endurance time of an electric appliance.

SUMMARY

This application provides a segment membrane, a battery combination, and an electrical device, to facilitate battery connection in the battery combination and reduce volume of the battery combination.

According to a first aspect, a segment membrane is provided. The segment membrane is used for electrical connection and isolation between electrode assemblies in a battery combination, where the segment membrane includes a multilayer structure, and specifically includes a conductive layer, a first insulation layer, and a second insulation layer that are disposed in a laminated manner, and the conductive layer is located between the first insulation layer and the second insulation layer. The conductive layer includes a first conductive part and a second conductive part that are disposed in a laminated manner and electrically connected. The first insulation layer is a frame structure, and the first insulation layer is disposed on a surface that is of the first conductive part and that is away from the second conductive part. The second insulation layer is a frame structure, and the second insulation layer is disposed on a surface that is of the second conductive part and that is away from the first conductive part. In the foregoing technical solution, the first conductive part of the segment membrane is connected to one electrode (a cathode or an anode) of a battery, the second conductive part is connected to one electrode (a cathode or an anode) of the electrode assembly, and a parallel connection and a series connection of the electrode assembly in the battery combination are implemented by using the segment membrane. Therefore, an electrode assembly connection in the battery combination can be simplified, volume of the battery combination can be reduced, and an energy density of the battery combination can be improved.

In a specific implementation, an outer frame edge of the first insulation layer is disposed along an edge of the first conductive part.

An outer frame edge of the second insulation layer is disposed along an edge of the second conductive part. The outer frame edge is disposed along the edge corresponding to the conductive part, so that the insulation layer can perform sealing processing with an edge of the electrode assembly.

In a specific implementation, an inner frame edge of the first insulation layer is a rectangle, a circle, an ellipse, or a special shape.

An inner frame edge of the second insulation layer is a rectangle, a circle, an ellipse, or a special shape, to connect electrodes of the electrode assemblies in different shapes.

In a specific implementation, the first conductive part includes one or more materials of copper, aluminum, nickel, iron, and carbon.

The second conductive part includes one or more materials of copper, aluminum, nickel, iron, and carbon.

In a specific implementation, the conductive layer further includes a connection layer, and the first conductive part and the second conductive part are electrically connected by using the connection layer.

In a specific implementation, the first conductive part and the second conductive part are an integral structure. When the electrodes connected to the segment membrane are the same, the first conductive part and the second conductive part may be manufactured by using a same material.

In a specific implementation, a third insulation layer is further included, where the third insulation layer at least partially wraps a sidewall of the conductive layer. The third insulation layer partially wraps the sidewall of the conductive layer to reduce current leakage.

In a specific implementation, a third insulation layer is further included, where the third insulation layer is a frame structure, and the third insulation layer is sleeved on the conductive layer and wraps a sidewall of the conductive layer. The sidewall of the conductive layer is electrically isolated by using the third insulation layer, to reduce a risk of current leakage when the electrode assembly is connected.

In a specific implementation, the third insulation layer, the first insulation layer, and the second insulation layer are an integral structure, to reduce the risk of current leakage when the electrode assembly is connected.

In a specific implementation, a third conductive part is further included, where the third conductive part is electrically connected to the first conductive part and the second conductive part separately. The third conductive part may be used as a connection point between the battery combination and an external part.

In a specific implementation, the third conductive part is used to connect to an external circuit or serve as a detection point of the battery combination. Different connection manners are implemented by using the third conductive part.

In a specific implementation, the third conductive part is used for electric potential measurement or capacity equalization adjustment of the battery combination.

In a specific implementation, when there are at least two third conductive parts, the third conductive parts are disposed on different sidewalls or a same sidewall of the conductive layer. For example, three third conductive parts are disposed on the same sidewall of the conductive layer, or distributed on adjacent sidewalls of the conductive layer, or may be distributed on any other sidewalls of the conductive layer. The third conductive part is extended outside the battery combination to facilitate connection to the external circuit.

In a specific embodiment, the third conductive part and the conductive layer are an integral structure, to improve a conductive effect of the segment membrane.

In a specific embodiment, when the segment membrane includes the third insulation layer, the third conductive part is exposed outside the third insulation layer, to facilitate connection to the external circuit.

According to a second aspect, a battery combination is provided. The battery combination includes a package layer, N electrode assemblies, and N−1 segment membranes according to any one of the foregoing implementations, where N is a positive integer greater than or equal to 2. The N−1 segment membranes separate the package layer into N sealing chambers, the N electrode assemblies are disposed one by one in the N sealing chambers, and each electrode assembly is electrically connected to an adjacent segment membrane. Each sealing chamber is filled with an electrolyte, and the segment membrane is used to isolate electrolytes in adjacent sealing chambers. In the foregoing technical solution, the first conductive part of the segment membrane is connected to one electrode (a cathode or an anode) of a battery, the second conductive part is connected to one electrode (a cathode or an anode) of the electrode assembly, and a parallel connection and a series connection of the electrode assembly in the battery combination are implemented by using the segment membrane. Therefore, an electrode assembly connection in the battery combination can be simplified, volume of the battery combination can be reduced, and an energy density of the battery combination can be improved.

In a specific implementation, the segment membrane isolates the electrolytes in the adjacent sealing chambers by using a conductive layer.

In a specific implementation, the segment membrane is hermetically connected to the package layer by using a first insulation layer and a second insulation layer. The first insulation layer and the second insulation layer are hermetically connected to the package layer to implement connection between the segment membrane and the package layer.

In a specific implementation, the segment membrane separates the electrolytes in the adjacent sealing chambers by using a conductive layer and a third insulation layer. The conductive layer and the third insulation layer are used for separation to form the sealing chambers, to reduce a use area of the conductive layer and further reduce costs.

In a specific implementation, the segment membrane is hermetically connected to the package layer by using a first insulation layer, a second insulation layer, and the third insulation layer. The first insulation layer, the second insulation layer, and the third insulation layer are hermetically connected to the package layer, to implement that the segment membrane is hermetically connected to the package layer.

In a specific implementation, the N electrode assemblies are connected in series or in parallel by using the N−1 segment membranes.

In a specific implementation, the N electrode assemblies are connected in series and parallel by using the N−1 segment membranes.

According to a third aspect, an electrical device is provided, where the electrical device includes a housing and the battery combination according to any one of the foregoing implementations disposed in the housing. In the foregoing technical solution, the first conductive part of the segment membrane is connected to one electrode (a cathode or an anode) of a battery, the second conductive part is connected to one electrode (a cathode or an anode) of the electrode assembly, and a parallel connection and a series connection of the electrode assembly in the battery combination are implemented by using the segment membrane. Therefore, an electrode assembly connection in the battery combination can be simplified, volume of the battery combination can be reduced, and an energy density of the battery combination can be improved.

DESCRIPTION OF EMBODIMENTS

Figure 1:
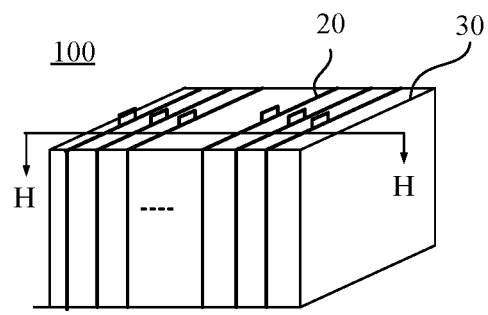
FIG. 1 is a schematic diagram of a structure of a battery combination according to an embodiment of this application.

To facilitate understanding of a segment membrane provided in embodiments of this application, an application scenario of the segment membrane is first described. A specific scenario of the segment membrane provided in embodiments of this application is a power battery used for an electric automobile and a digital battery used for a consumer electronic product (for example, a smartphone, a smartwatch, a smart band, and a Bluetooth headset), and an energy storage battery system in the energy internet field. For example, for a power battery system used for the electric automobile, the power battery system is composed of dozens of individual batteries first connected in parallel and then connected in series. In the conventional technology, when a battery combination is connected in series or in parallel, an energy density of the entire battery combination or a battery system is reduced due to introduction of other connectors and structural components or a change of an internal structure of a battery. Therefore, embodiments of this application provide a segment membrane, to improve volume of a battery combination after batteries are assembled into the battery combination, and improve an energy density of the battery combination.

For ease of understanding, the following concepts are described first:

Cathode (Cathode): In a primary battery, an electrode from which a current flows has a higher potential, which is a cathode, and electrons are obtained to perform reduction. In an electrolytic cell, the cathode is an electrode connected to a positive electrode of a power source, and electrons are lost to perform oxidation.

Anode (Anode): In a primary cell, an electrode into which a current flows has a lower potential, which is an anode, and electrons are lost to perform oxidation. In an electrolytic cell, the anode is an electrode connected to a negative electrode of a power source, and electrons are obtained to perform reduction.

Separator (separator): A main function of the separator is to separate a cathode and an anode of a battery to prevent the two electrodes from contacting and short circuit. In addition, the separator also has a function of allowing electrolyte ions to pass through.

Active layer (active layer): a cathode material layer on the cathode and an anode material layer on the anode.

Current collector (current collector): A function of the current collector is to collect currents generated by a cathode pole plate and an anode pole plate. There are only two types of current collectors in a battery, namely, a cathode current collector and an anode current collector. The current collector is coated with an anode active material or a cathode active material. A current generated by the active material is collected by the current collector and then transferred to a battery tab.

Electrode group (electrode group): The electrode group includes an electrode assembly and a battery external package layer. The electrode assembly refers to an assembly of the cathode, the anode, and the separator inside the battery. The separator is used to separate the cathode and the anode, and ion conduction between the cathode and the anode is implemented by using the separator. The cathode, the anode, and the separator of the battery may form the electrode assembly through winding, may form the electrode assembly through laminating, or may form the electrode assembly through winding and laminating, and a specific combination manner thereof is not limited herein. Battery external package layer: A function of the battery external package layer is to package the electrode assembly and an electrolyte to isolate the electrode assembly from an external environment, to prevent gas or water in the external environment from entering the battery.

Segment membrane (segment membrane): In a battery combination, the segment membrane separates different electrode assemblies, so that electrolytes of different electrode assemblies are isolated from each other and cannot be mixed with each other. However, different electrode assemblies can be electrically connected by using the segment membrane. In other words, the segment membrane allows ion insulation between the different electrode assemblies, but the electrons can be conductive.

Confluence part (confluence part): An electrode assembly has a positive confluence part and a negative confluence part, where the positive confluence part is used to collect currents of all cathodes, and the negative confluence part is used to collect currents of all anodes. The positive confluence part and the negative confluence part may be a cathode tab and an anode tab of the electrode assembly, or an outermost current collector of the wound electrode assembly, or welding parts of all cathodes and welding parts of all anodes on the laminated electrode assembly.

Figure 2:
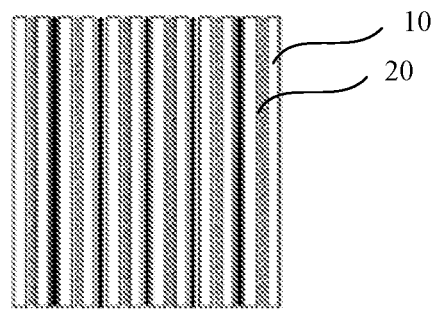
FIG. 2 is a sectional view of FIG. 1 at H-H.

FIG. 1 is a schematic diagram of a structure of a battery combination according to an embodiment of this application, and FIG. 2 is a partial enlarged view of FIG. 1 at H-H. A battery combination 100 provided in this embodiment of this application includes a package layer 30, a plurality of electrode assemblies 10, and a plurality of segment membranes 20. The segment membranes 20 are hermetically connected to the package layer 30, and the package layer 30 is divided into a plurality of sealing chambers. The plurality of electrode assemblies 10 are disposed in the plurality of sealing chambers one by one, each sealing chamber is filled with an electrolyte, and electrolytes in adjacent sealing chambers are separated by the segment membranes 20. As shown in FIG. 2, the plurality of electrode assemblies 10 and the plurality of segment membranes 20 are alternately arranged. Each electrode assembly 10 is electrically connected to an adjacent segment membrane 20.

Figure 3:
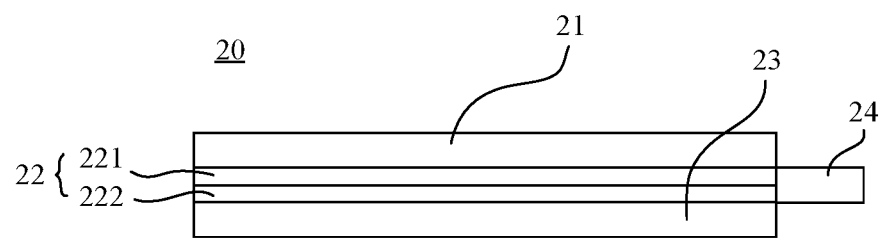
FIG. 3 is a schematic diagram of a layer structure of a segment membrane according to an embodiment of this application.

FIG. 3 is a schematic diagram of a structure of the segment membrane 20 according to this embodiment of this application. It can be learned from FIG. 3 that the segment membrane 20 provided in this embodiment of this application includes a conductive layer 22, and the conductive layer 22 is configured to electrically connect to an adjacent electrode assembly, and may be configured to connect to an external circuit. The conductive layer 22 includes a first conductive part 221 and a second conductive part 222 that are disposed in a laminated manner, and the first conductive part 221 is electrically connected to the second conductive part 222. When connecting to the electrode assembly, the first conductive part 221 is connected to an electrode (a positive confluence part or a negative confluence part) of one adjacent electrode assembly, and the second conductive part 222 is connected to an electrode (a positive confluence part or a negative confluence part) of one adjacent electrode assembly. When electrodes connected to the first conductive part 221 and the second conductive part 222 are the same, the first conductive part 221 and the second conductive part 222 may be an integral structure, that is, the first conductive part 221 and the second conductive part 222 are manufactured by using a same material. When electrodes connected to the first conductive part 221 and the second conductive part 222 are opposite, the first conductive part 221 and the second conductive part 222 are manufactured by using different materials. For example, materials of the first conductive part 221 and the second conductive part 222 include one or a combination including two or more of carbon, aluminum, copper, iron, zinc, nickel, an aluminum alloy, stainless steel, a carbon material, a conductive polymer material, copper-aluminum composite foil, nickel-copper composite foil, nickel-aluminum composite foil, iron-aluminum composite foil, iron-copper composite foil, carbon/aluminum composite foil, and copper/carbon composite foil, or other conductive materials may be used. These types of conductive materials may also form the conductive layer 22 by a multilayer combination. For example, different combinations such as a copper layer/an aluminum layer, a copper layer/an aluminum layer/a copper layer, an aluminum layer/a copper layer/an aluminum layer, and a copper layer/an iron layer/an aluminum layer can form the conductive layer 22. When a three-layer structure is used, two metal layers located at outer layers are respectively the first conductive part 221 and the second conductive part 222, a layer located in the middle is a connection layer, and the first conductive part 221 and the second conductive part 222 are connected by using the connection layer (not shown in the figure). When the conductive layer 22 uses a two-layer structure, the two-layer structure is respectively the first conductive part 221 and the second conductive part 222. Certainly, the conductive layer 22 may alternatively be manufactured by using a single layer, for example, the copper layer or the aluminum layer. In this case, the first conductive part 221 and the second conductive part 222 are an integral structure. However, regardless of the layer structure, a thickness of the conductive layer 22 is from 1 μm to 150 μm, for example, 1 micron, 10 microns, 50 microns, 100 microns, or 150 microns.

When the conductive layer 22 is manufactured by using different materials, the conductive layer 22 may be separately connected to the positive confluence part or the negative confluence part, or connected to both the positive confluence part and the negative confluence part of the electrode assembly because of a difference in material properties. For example, when the material of the conductive layer 22 is aluminum, an aluminum alloy, carbon, or the like, positive confluence parts of two adjacent electrode assemblies may be connected to the first conductive part 221 and the second conductive part 222 of the segment membrane, to implement a parallel connection of the adjacent electrode assemblies. For example, when the material of the conductive layer 22 is copper, iron, or the like, negative confluence parts of two adjacent electrode assemblies may be connected to the first conductive part 221 and the second conductive part 222 of the segment membrane, to implement a parallel connection of the adjacent electrode assemblies. For example, when the material of the conductive layer 22 is aluminum-copper composite foil, a carbon material, iron-aluminum composite foil, or the like, positive confluence parts of two adjacent electrode assemblies may be connected to the first conductive part 221 of the segment membrane, and negative confluence parts of the two adjacent electrode assemblies may be connected to the second conductive part 222 of the segment membrane, to implement a series connection of the adjacent electrode assemblies.

Figure 4:
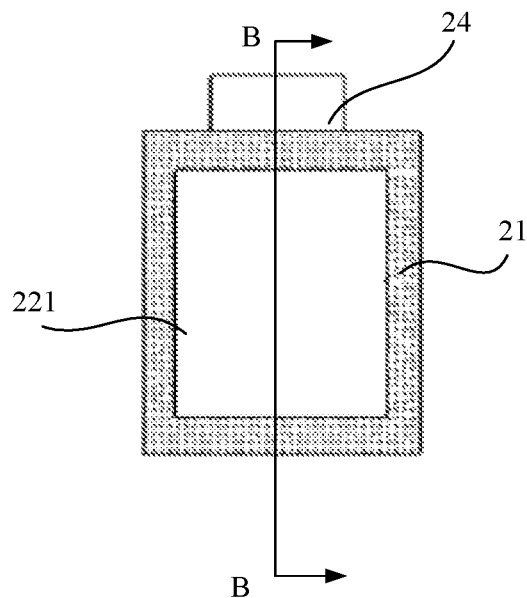
FIG. 4 is a schematic diagram of a structure of a first surface of a segment membrane according to an embodiment of this application.

Still referring to FIG. 3, the segment membrane 20 provided in this embodiment of this application further includes a first insulation layer 21 and a second insulation layer 23, and the first insulation layer 21 and the second insulation layer 23 are arranged on two opposite sides of the conductive layer 22. Connection manners of the first insulation layer 21, the second insulation layer 23, and the conductive layer 22 include a tape casting manner, a direct casting film manner, a solvent evaporation manner, an epitaxial growth manner, a bonding manner, and other composite manners well known to a person skilled in the art. Also referring to FIG. 4, FIG. 4 is a schematic diagram of a structure of a first surface of the segment membrane. As shown in FIG. 2, the conductive layer of the segment membrane includes the first conductive part 221, a shape of the first insulation layer 21 is a closed frame structure, and the first insulation layer 21 is disposed on a surface that is of the first conductive part 221 and that is away from the second conductive part 222. Still referring to FIG. 4, an outer frame edge of the first insulation layer 21 is disposed along an edge of the first conductive part 221. When the segment membrane 20 is connected to the electrode assembly, the first insulation layer 21 is hermetically connected to the package layer, to prevent the edge of the first conductive part 221 from being exposed.

Figure 5:
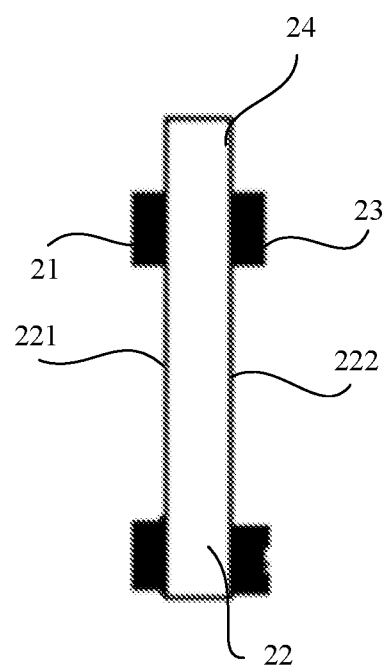
FIG. 5 is a sectional view of FIG. 4 at B-B.

FIG. 5 is a sectional view of FIG. 4 at B-B. A thickness of the first insulation layer 21 is 100 nm to 100 μm, for example, 100 nanometers, 1 micron, 10 microns, 50 microns, or 100 microns. A material of the first insulation layer 21 includes one or a combination including two or more of polyethylene, polyvinyl chloride, polypropylene, a polyethylene terephthalate layer, polyamide, polyisophthaloyl metaphenylene diamine, polyacrylonitrile, polyvinyl formal, polystyrene, and epoxy resin. These types of polymers may also form the first insulation layer 21 by a multilayer combination. For example, a bottom layer is a mixed layer of polyolefin and epoxy resin, and an upper layer is a polypropylene layer.

Figure 6:
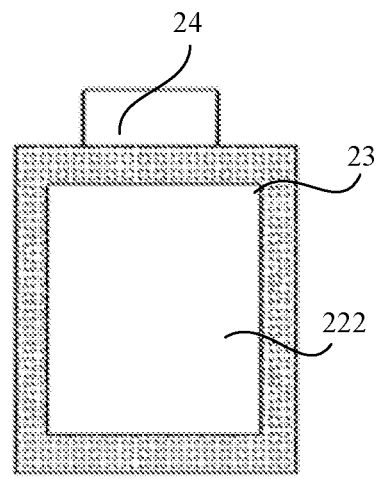
FIG. 6 is a schematic diagram of a structure of a second surface of a segment membrane according to an embodiment of this application.

Still referring to FIG. 5, the second insulation layer 23 and the second conductive part 222 are located on a same surface of the conductive layer 22. FIG. 6 is a schematic diagram of a structure of a second surface of the conductive layer 22. In FIG. 6, the conductive layer 22 includes the second conductive part 222, a shape of the second insulation layer 23 is a closed frame structure, and the second insulation layer 23 is disposed on a surface that is of the second conductive part 222 and that is away from the first conductive part 221. Still referring to FIG. 6, an outer frame edge of the second insulation layer 23 is disposed along an edge of the second conductive part 222. When the segment membrane is connected to the electrode assembly, the second insulation layer 23 is hermetically connected to a main body of the electrode assembly, to prevent the edge of the second conductive part 222 from being exposed. For a material of the second insulation layer 23, refer to the material of the first insulation layer, and details are not described herein again.

Sizes and shapes of the first conductive part 221 and the second conductive part 222 provided in this embodiment of this application are the same, but shapes and sizes of the first conductive part 221 and the second conductive part 222 provided in this embodiment of this application are not specifically limited. In other words, the first conductive part 221 and the second conductive part 222 shown in FIG. 3 and FIG. 7 may be the same in shape and size, or may be different in shape, or may be different in size. The foregoing size refers to an area of the first conductive part 221 or the second conductive part 222. Specific shapes of the first conductive part 221 and the second conductive part 222 provided in this embodiment of this application are described below with reference to the accompanying drawings. The first conductive part is used as an example.

Figure 7:
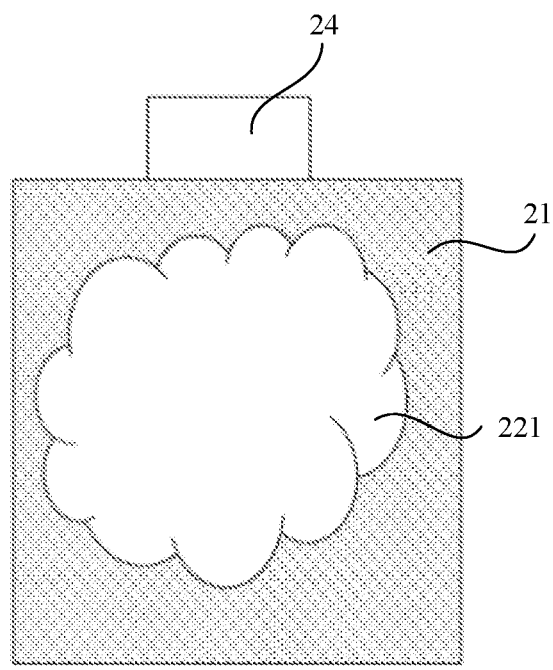
FIG. 7 is a schematic diagram of a structure of a first surface of a second segment membrane according to an embodiment of this application.

FIG. 7 is a schematic diagram of a structure of a second segment membrane. In this embodiment of this application, an inner frame edge of the first insulation layer 21 is a cloud shape, and a part that is of the first conductive part 221 and that is exposed outside the first insulation layer 21 is also a cloud shape. Similarly, the second insulation layer also uses a corresponding shape.

Figure 8:
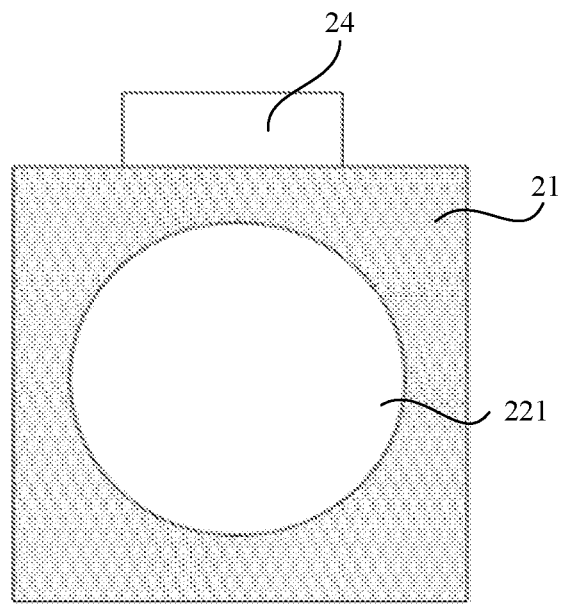
FIG. 8 is a schematic diagram of a structure of a first surface of a third segment membrane according to an embodiment of this application.

FIG. 8 is a schematic diagram of a structure of a third segment membrane. In this embodiment of this application, an inner frame edge of the first insulation layer 21 is a circle shape, and a part that is of the first conductive part 221 and that is exposed outside the first insulation layer 21 is the circle shape shown in FIG. 8. Similarly, the second insulation layer also uses a corresponding shape.

Figure 9:
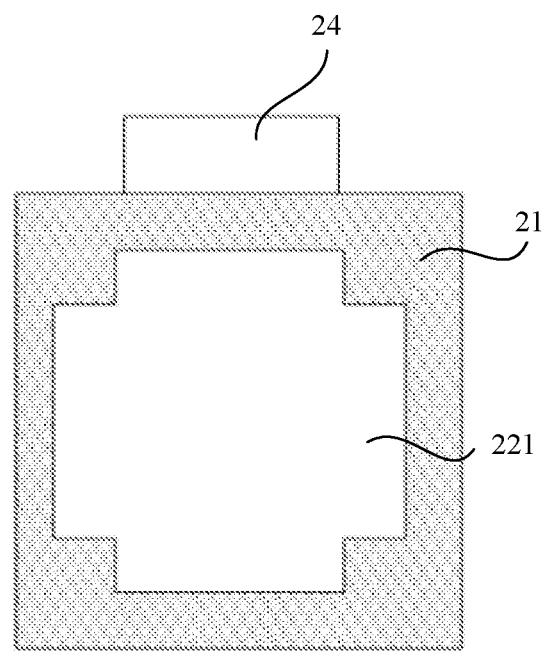
FIG. 9 is a schematic diagram of a structure of a first surface of a fourth segment membrane according to an embodiment of this application.

FIG. 9 is a schematic diagram of a structure of a fourth segment membrane. In this embodiment of this application, an inner frame edge of the first insulation layer 21 is a cross shape, and a part that is of the first conductive part 221 and that is exposed outside the first insulation layer 21 is the cross shape shown in FIG. 9. Similarly, the second insulation layer also uses a corresponding shape.

It should be understood that FIG. 7, FIG. 8, and FIG. 9 each merely illustrate a specific shape of the inner frame edge of the first insulation layer 21 provided in this embodiment of this application, and an exposed shape of the first conductive part 221 may be a different shape such as a rectangle, a circle, an ellipse, or a special shape, provided that a closed frame shape is formed. A shape of the closed frame shape is not limited in this embodiment of this application. Similarly, the shape of the inner frame edge of the second insulation layer 23 may also be the foregoing different shape such as a rectangle, a circle, an ellipse, or a special shape. A shape of the closed frame shape is not limited in this embodiment of this application.

Figure 10:
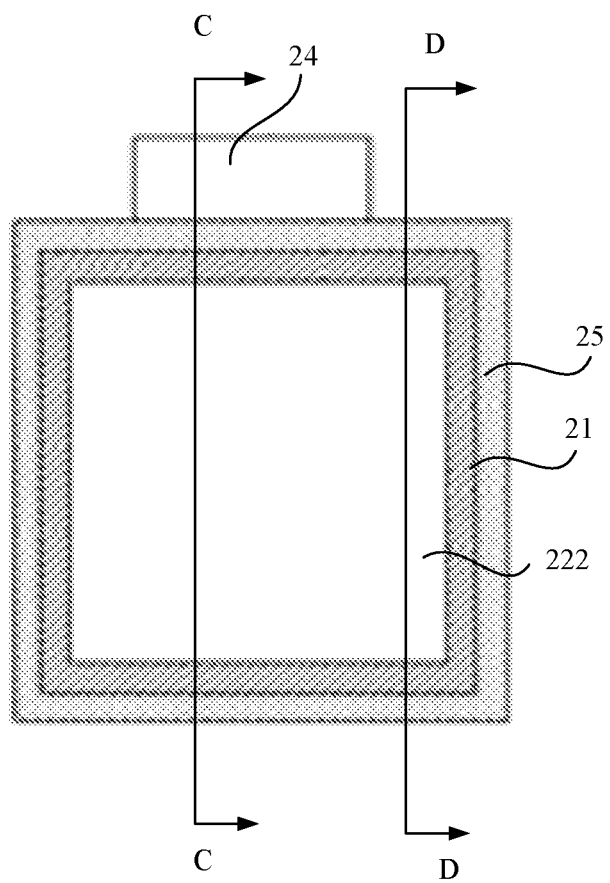
FIG. 10 is a schematic diagram of a structure of a fifth segment membrane according to an embodiment of this application.
Figure 11:
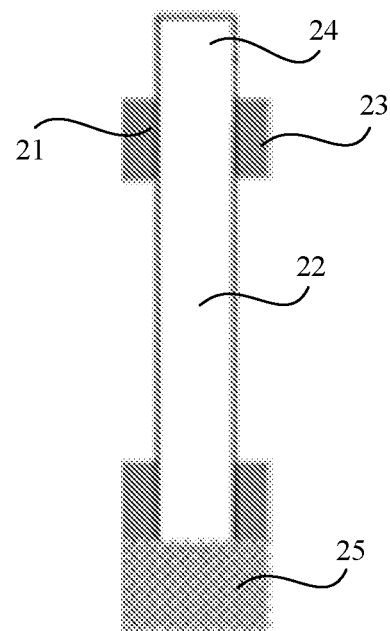
FIG. 11 is a sectional view of FIG. 10 at C-C.
Figure 12:
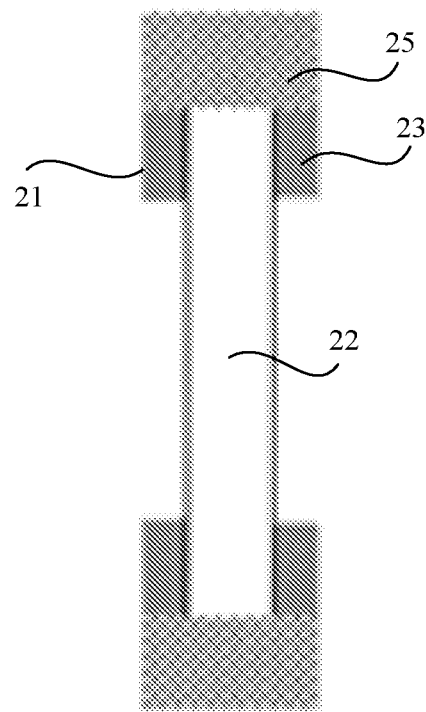
FIG. 12 is a sectional view of FIG. 10 at D-D.

FIG. 10 is a schematic diagram of a structure of a fifth segment membrane according to an example of this application, FIG. 11 is a sectional view of FIG. 10 at C-C, and FIG. 12 is a sectional view of FIG. 10 at D-D. For the same reference signs in FIG. 10, FIG. 11, and FIG. 12, refer to reference signs in FIG. 3. A segment membrane shown in FIG. 10 further includes a third insulation layer 25, the third insulation layer 25 is a frame structure, and the third insulation layer 25 is sleeved on the conductive layer 22 and wraps a sidewall of the conductive layer 22. The third insulation layer 25 has a function of insulating an edge (except a third conductive part) of the conductive layer 22 to prevent current leakage from the edge of the conductive layer 22. In addition, when the segment membrane is connected to the electrode assembly, the third insulation layer 25 may also separate electrolytes in adjacent sealing chambers, to implement ion insulation in the adjacent sealing chambers. A material of the third insulation layer 25 includes one or a combination including two or more of polyethylene, polyvinyl chloride, polypropylene, a polyethylene terephthalate layer, polyamide, polyisophthaloyl metaphenylene diamine, polyacrylonitrile, polyvinyl formal, and polystyrene. Alternatively, these types of polymers may also form the third insulation layer 25 by a multilayer combination. A thickness of the third insulation layer 25 is 100 nm to 200 μm, for example, 100 nanometers, 1 micron, 10 microns, 50 microns, 100 microns, or 200 microns.

Still referring to FIG. 10, FIG. 11, and FIG. 12, when the third insulation layer 25 is disposed, the third insulation layer 25 is hermetically connected to the first insulation layer 21 and the second insulation layer 23. The third insulation layer 25 may be disposed into an integral structure with the first insulation layer 21 and the second insulation layer 23, to improve an insulating effect of the insulation layer on the conductive layer 22. Alternatively, the third insulation layer 25, the first insulation layer 21, and the second insulation layer 23 may be disposed in a split manner. When the split manner is used, sealing processing is performed on connection parts of the third insulation layer 25 and the first insulation layer 21 and the second insulation layer 23. For example, a sealant is used, which is not specifically limited herein.

FIG. 10 illustrates a manner in which the third insulation layer 25 wraps the sidewall of the conductive layer 22, but the foregoing wrapping manner is not specifically limited in this embodiment of this application. In this embodiment of this application, the third insulation layer 25 may wrap at least a part of sidewalls of the conductive layer 22. As shown in FIG. 10, the third insulation layer 25 wraps all sidewalls of the conductive layer 22. Alternatively, the third insulation layer 25 may wrap only a part of the sidewalls of the conductive layer 22, for example, wrap three sidewalls or two sidewalls of the conductive layer 22, or wrap three sidewalls and a part of the rest sidewall.

Referring to FIG. 4 to FIG. 10, the conductive layer provided in this embodiment of this application is further connected to a third conductive part 24. When the third conductive part 24 is connected to the conductive layer 22, the third conductive part 24 is electrically connected to the first conductive part 221 and the second conductive part 222 separately. For example, the third conductive part 24 may be integrated with the conductive layer 22, or may be electrically connected to the conductive layer 22 by welding. Still referring to FIG. 4 and FIG. 10, it can be learned from FIG. 4 and FIG. 10 that, the third conductive part 24 provided in this embodiment of this application is disposed on a sidewall of the conductive layer 22, and when the segment membrane includes the third insulation layer 25, the third conductive part 24 is exposed outside the third insulation layer 25.

The third conductive part 24 may implement electrical connection between the segment membrane and an external circuit or serve as a detection point of the battery combination. When the third conductive part 24 is connected to the external circuit, the third conductive part 24 may be used for electric potential measurement or capacity equalization in the battery combination. When serving as a detection point, the third conductive part 24 may be directly connected to a sensor, such as a voltage sensor.

As shown in FIG. 10, one third conductive part 24 is disposed on the sidewall of the conductive layer 22, and the third conductive part 24 is exposed outside the third insulation layer after passing through the third insulation layer. The third conductive part 24 is configured to connect to the external circuit, so that the battery combination can provide electric energy. When providing electric energy, the battery combination may be connected in series or in parallel to the external circuit by using the third conductive part 24.

Figure 13:
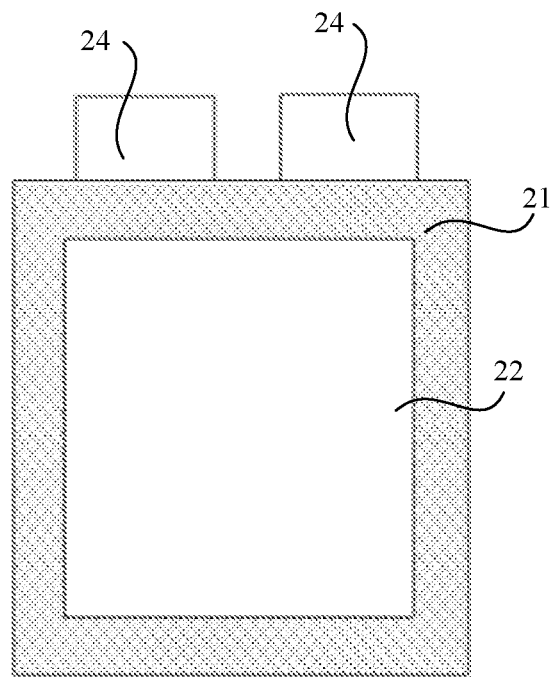
FIG. 13 is a schematic diagram of a structure of a sixth segment membrane according to an embodiment of this application.

FIG. 13 is a schematic diagram of a structure of a sixth segment membrane. The segment membrane shown in FIG. 13 includes two third conductive parts 24, and the two third conductive parts 24 are disposed on a same sidewall of the conductive layer. One third conductive part 24 is used for current conduction of the battery combination, that is, the electrode assembly is connected to the external circuit by using the third conductive part 24 for power supply or charging, and the other third conductive part 24 is used for electric potential measurement of the battery combination, that is, a voltage of the electrode assembly can be measured by the third conductive part 24.

Figure 14:
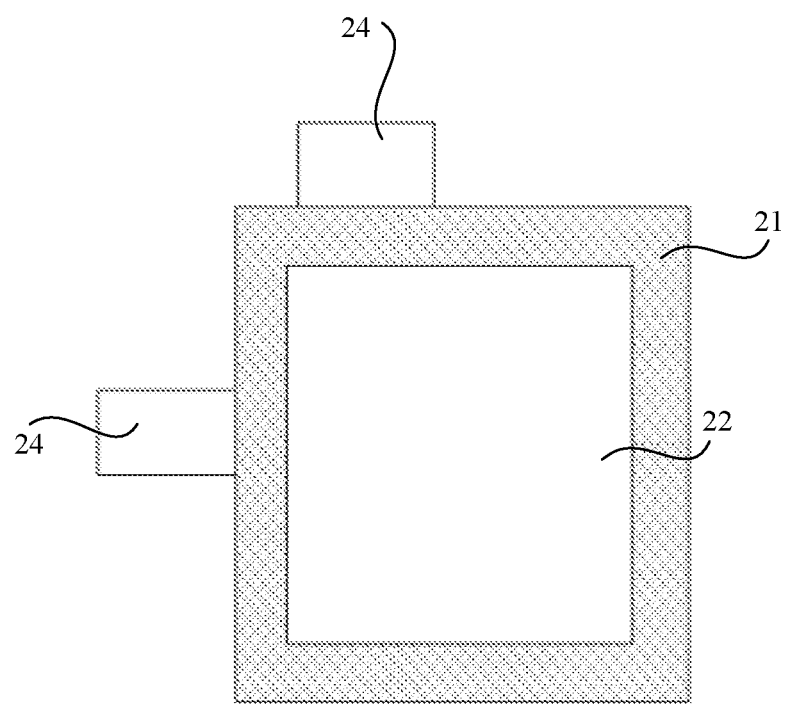
FIG. 14 is a schematic diagram of a structure of a seventh segment membrane according to an embodiment of this application.

FIG. 14 is a schematic diagram of a structure of a seventh segment membrane. The segment membrane shown in FIG. 14 includes two third conductive parts 24, and the two third conductive parts 24 are disposed on two different sidewalls of the conductive layer 22. One third conductive part 24 is used for current conduction, and the other third conductive part 24 is used for electric potential measurement.

Figure 15:
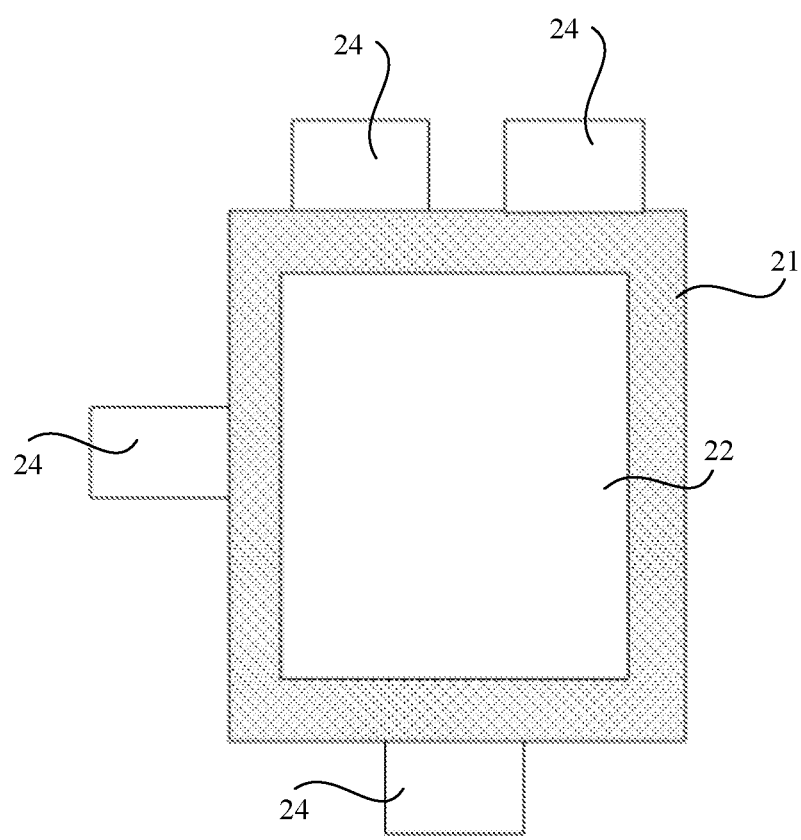
FIG. 15 is a schematic diagram of a structure of an eighth segment membrane according to an embodiment of this application.

FIG. 15 is a schematic diagram of a structure of an eighth segment membrane. The segment membrane shown in FIG. 15 includes three third conductive parts 24. Two third conductive parts 24 in the three third conductive parts 24 are disposed on a same sidewall of the conductive layer 22, and the rest third conductive part 24 is disposed on another sidewall. The first third conductive part 24 is used for current conduction, the second third conductive part 24 is used for electric potential measurement, and the third conductive part 24 is used for capacity equalization between electrode assemblies combined with each other. In actual implementation, the external circuit can charge or discharge the electrode assemblies by using the third conductive part. Therefore, capacities of different electrode assemblies can be adjusted, to implement capacity equalization between different electrode assemblies.

As can be seen from the segment membranes shown in FIG. 10 to FIG. 15, different control functions for the battery combination, such as electric potential measurement, current conduction, and capacity equalization, can be implemented by adding different quantities of third conductive parts 24. A quantity of third conductive parts 24 in this embodiment of this application is not specifically limited in this application, for example, one, two, or three in the foregoing example. When other conductive functions are required, the quantity of third conductive parts 24 may be further increased, such as four or five shown in FIG. 15. A circuit outside the battery combination is connected by using the added at least one third conductive part 24 as the segment membrane.

An embodiment of this application further provides a battery combination. As shown in FIG. 1 and FIG. 2, the battery combination provided in this embodiment of this application includes a package layer 30, N electrode assemblies 10, and N−1 the foregoing segment membranes 20, where N is a positive integer greater than or equal to 2. The N−1 segment membranes 20 separate the package layer 30 into N sealing chambers. The N electrode assemblies 10 are disposed one by one in the N sealing chambers, and each electrode assembly 10 is electrically connected to an adjacent segment membrane 20. Each sealing chamber is filled with an electrolyte, and the segment membrane 20 is used to isolate electrolytes in adjacent sealing chambers, to implement that the plurality of electrode assemblies 10 are connected by the segment membranes 20 to form the battery combination.

First, the electrode assembly in this application is described. The electrode assembly provided in this embodiment of this application is a structure obtained after an outer package layer of a battery is removed. The battery is an apparatus that can convert chemical energy into electric energy, and may be a lithium ion battery, a lithium metal battery, and the like. The lithium ion battery includes a battery using materials that can be inlaid to or removed from lithium ions as electrode materials, such as graphite, silicon, silicon oxide, lithium titanate, lithium cobalt oxide, lithium iron phosphate, lithium manganese oxide, a nickel cobalt manganese ternary material, and a nickel manganese spinel material, or lithium nickelate. The lithium metal battery includes a battery having lithium metal, a lithium alloy, or a mixture of lithium metal and other materials as an electrode material. The battery includes a positive confluence part and a negative confluence part. The positive confluence part is used to collect currents of all cathodes, and the negative confluence part is used to collect currents of all anodes. The positive confluence part and the negative confluence part may be a cathode tab and an anode tab of the electrode assembly, or an outermost current collector of a wound electrode assembly, or welding parts of all cathodes and all anodes on a laminated electrode assembly. Structures and locations of the positive confluence part and the negative confluence part are not limited in this embodiment of this application. When the segment membrane is connected to the electrode assembly, positive confluence parts or negative confluence parts of adjacent electrode assemblies are electrically connected to the first conductive part and the second conductive part of the segment membrane respectively. In addition, the conductive layer and the third insulation layer on the segment membrane can separate electrolytes of the adjacent electrode assemblies, to implement electron conduction and ion insulation of the adjacent electrode assemblies. When the third conductive part is included, the third conductive part may be disposed to implement independent operation and independent control of the battery.

The battery of the present invention may be manufactured by winding, laminating, or winding and laminating, or other manufacturing methods well known to a person skilled in the art.

For example, the battery is implemented in the winding manner, which is specifically as follows:

The following table lists main parameters of the battery.

TABLE 1

Main parameters of the battery in this embodiment

| Cathode | | Anode | |
|---|---|---|---|
| Current collector | 14 μm Al foil | Current collector | 8 μm Cu foil |
| Active substance | Lithium cobalt oxide material | Active substance | Graphite |
| Capacity per gram | 170 mAhg − 1 | Capacity per gram | 355 mAhg − 1 |
| Membrane | | Package layer | |
| Membrane | 13 μm | Package layer material | Aluminum plastic film and copper plastic film |

Battery manufacturing adopts a typical winding process flow: Anode and cathode materials are respectively made into anode and cathode slurry by a stirring pulping process, then electrode plates are manufactured by a coating and drying process, then the electrode plates with a specific compaction density are manufactured by a rolling process, and then the electrode plates are divided into strips. After the electrode plates are divided into strips, an anode plate and a cathode plate are dried, a separator is obtained, and anode and cathode separators are wound to manufacture a battery. After winding, the battery is hot pressed and shaped. Then, a confluence part of the battery is connected to a segment membrane. Welding, riveting, bonding (such as using conductive glue or a conductive adhesive tape) may be adopted for connection. A package material is taken out, the battery is packaged once by using the package material, and then secondary packaging is performed after drying, liquid injection, and formation. In this way, battery manufacturing is completed. Key process steps are explained as follows:

The stirring means that special solvent and binder are respectively mixed with powdered cathode and anode active substances, and slurry-like cathode and anode materials are manufactured after uniform stirring at a high speed. The coating means uniformly coating the manufactured slurry on a surface of metal foil.

The drying is a process of evaporation of solvent and water in the coated electrode plates.

The rolling means that the coated electrode plates are rolled to have a specific compaction density by using a roller press.

The strip division means cutting the rolled electrode plates into electrode plates with a specific width.

The winding refers to winding the cathode plate, the anode plate, and the separator into the battery by a winding machine, and the separator separates the cathode plate and the anode plate in the winding process, followed by a process such as hot pressing and shaping.

The packaging means that an electrode assembly is wrapped with a package layer, and tab glue of the battery is hot pressed and fused with the package layer.

The liquid injection means injecting an electrolyte into the battery.

The formation refers to conversion of active substances inside the battery by adjusting a charging current, a voltage, and time. During the formation, a gas is generated inside the battery.

Air extraction means extracting the gas generated inside the battery and excess electrolyte from a battery housing by using a vacuum device.

Figure 16:
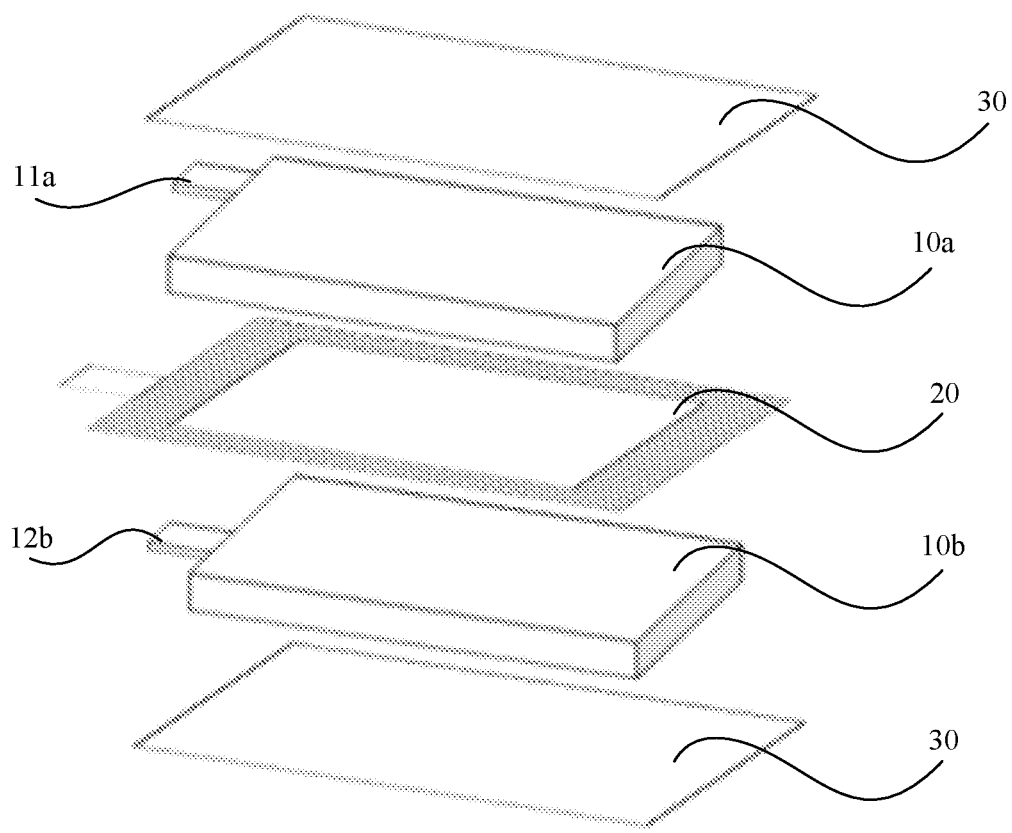
FIG. 16 is a schematic diagram of decomposition of a battery combination formed in series by batteries according to an embodiment of this application.
Figure 17:
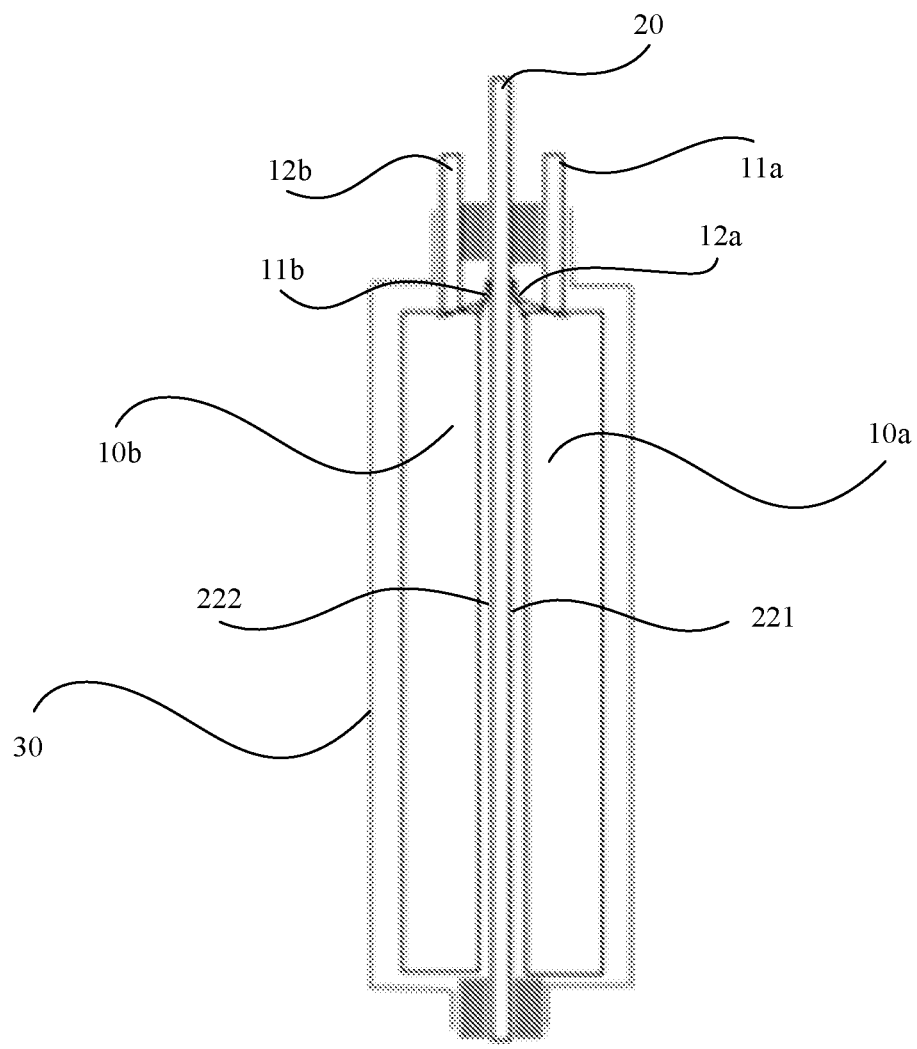
FIG. 17 is a schematic diagram of an internal structure of the battery combination shown in FIG. 16.

Batteries are combined into a battery combination by using a segment membrane. FIG. 16 is a schematic diagram of a battery combination formed by two electrode assemblies in series by using a segment membrane. FIG. 17 is a schematic diagram of an internal structure of the battery combination shown in FIG. 16. A first electrode assembly 10*a* includes a positive confluence part 12*a* and a negative confluence part 11*a*, and a second electrode assembly 10*b* includes a positive confluence part 12*b* and a negative confluence part 11*b*. The positive confluence part 12*a* of the first electrode assembly 10*a* is connected to a first conductive part 221*a* of the segment membrane 20, and the negative confluence part 11*b* of the second electrode assembly 10*b* is connected to a second conductive part 222 of the segment membrane 20. In this way, the first electrode assembly 10*a* and the second electrode assembly 10*b* may be connected in series, and then a package layer 30 and the segment membrane 20 may be packaged. It can be seen from FIG. 17, the segment membrane 20 divides space in the package layer 30 into two sealing chambers. During connection, a first insulation layer and a second insulation layer of the segment membrane 20 are hermetically connected to the package layer 30 separately. The segment membrane 20 is hermetically connected to the package layer 30 by using the first insulation layer and the second insulation layer, and the segment membrane 20 isolates electrolytes in the two sealing chambers by using a conductive layer.

Figure 18:
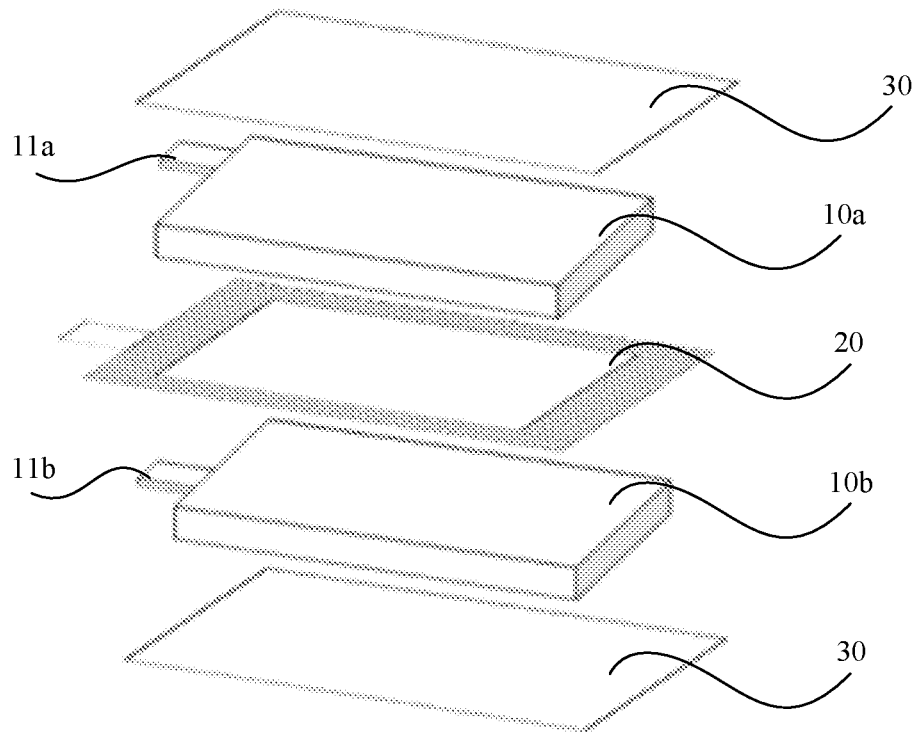
FIG. 18 is a schematic diagram of decomposition of a battery combination formed in parallel by batteries according to an embodiment of this application.
Figure 19:
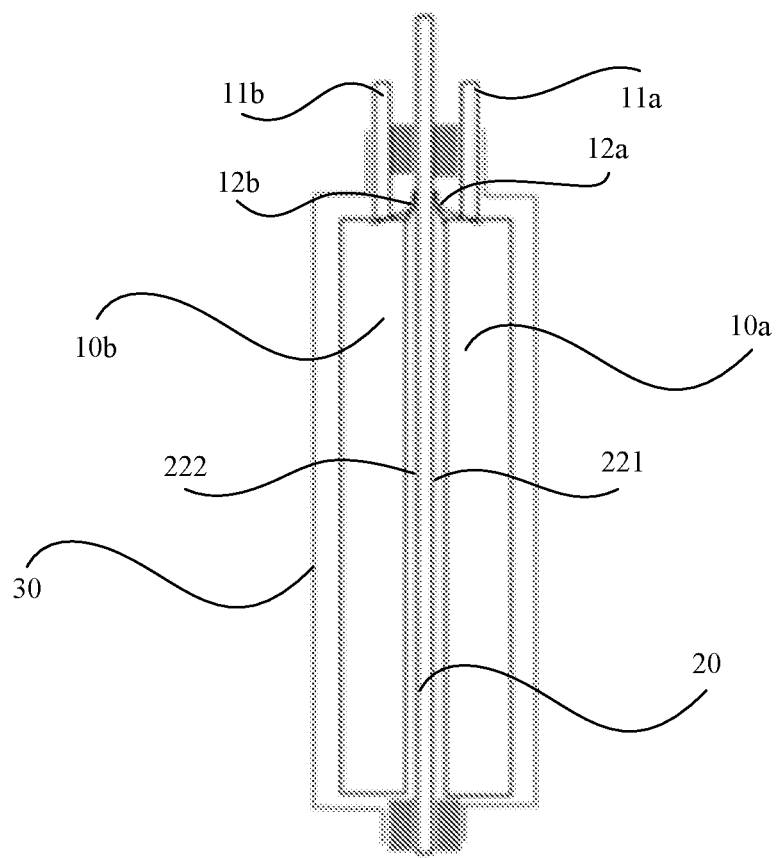
FIG. 19 is a schematic diagram of an internal structure of the battery combination shown in FIG. 18.

FIG. 18 is a schematic diagram of a battery combination formed by two electrode assemblies in parallel by using a segment membrane. FIG. 19 is a schematic diagram of an internal structure of the battery combination shown in FIG. 18. A first electrode assembly 10*a* includes a positive confluence part 12*a* and a negative confluence part 11*a*, and a second electrode assembly 10*b* includes a positive confluence part 12*b* and a negative confluence part 11*b*. The positive confluence part 12*a* of the first electrode assembly 10*a* is connected to a first conductive part 221 of the segment membrane 20, and the positive confluence part 12b of the second electrode assembly 10b is connected to a second conductive part 222 of the segment membrane 20. Alternatively, the negative confluence part 11 of the first electrode assembly 10a is connected to the first conductive part 221 of the segment membrane 20, and the negative confluence part 11 of the second electrode assembly 10b is connected to the second conductive part 222 of the segment membrane 20. In this way, the first electrode assembly 10a and the second electrode assembly 10b may be connected in parallel, and then a package layer 30 and the segment membrane 20 may be packaged. For a specific connection manner of the package layer 30 and the segment membrane 20, refer to related description in FIG. 17.

Figure 20:
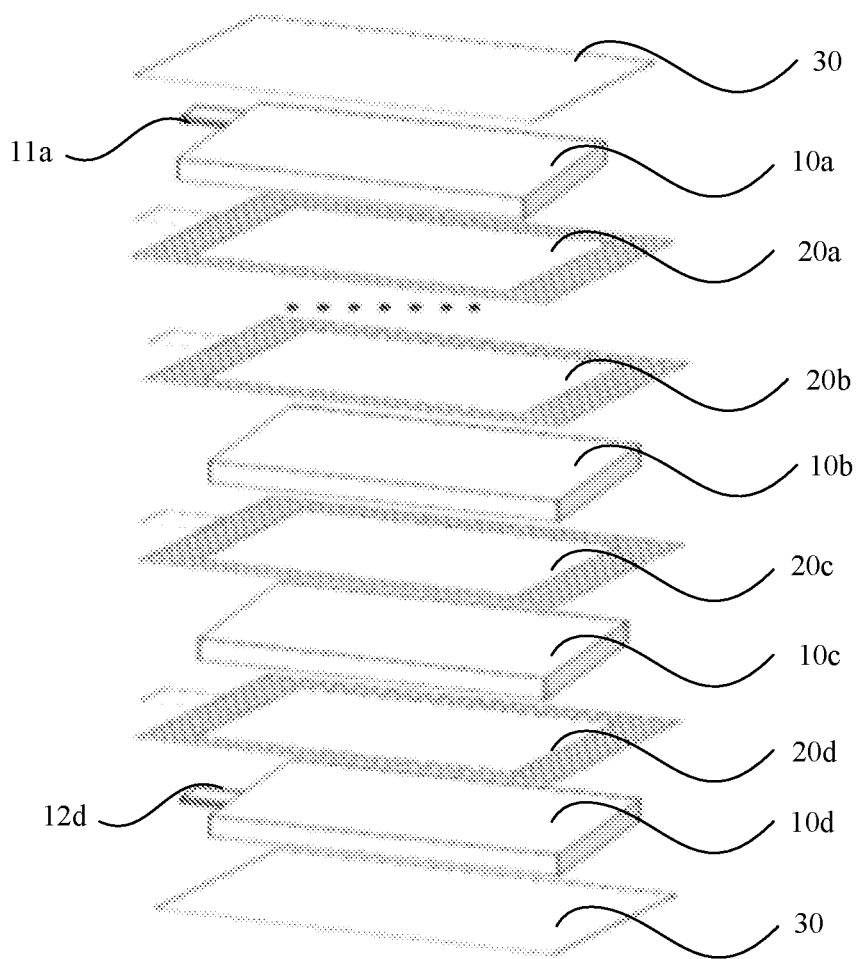
FIG. 20 is a schematic diagram of a battery combination formed by N batteries in series by using N−1 segment membranes according to an embodiment of this application.
Figure 21:
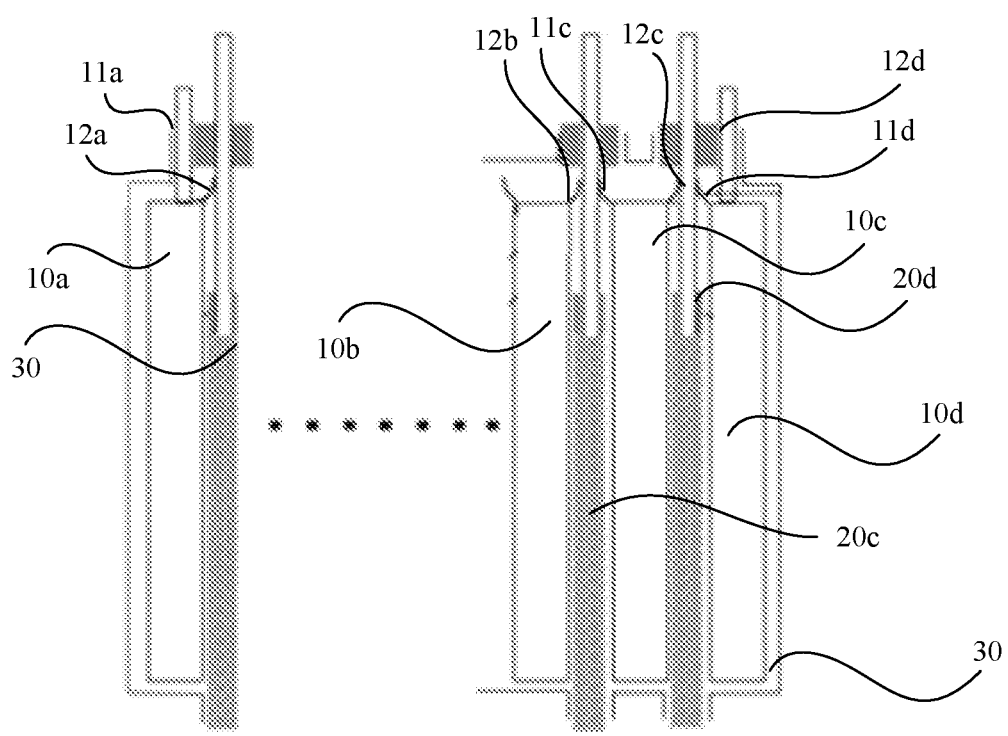
FIG. 21 is a schematic diagram of an internal structure of the battery combination shown in FIG. 20.

FIG. 20 is a schematic diagram of a battery combination formed by N electrode assemblies in series by using N−1 segment membranes, and FIG. 21 is a schematic diagram of an internal structure of the battery combination shown in FIG. 20, where N is a positive integer greater than 2. Each segment membrane shown in FIG. 20 includes a third insulation layer, and only a main structure of the segment membrane is shown in FIG. 20, but the third insulation layer is not shown. A positive confluence part 12a of a first electrode assembly 10a is connected to a first conductive part of a first segment membrane 20a, a negative confluence part 11 of a second electrode assembly is connected to a second conductive part of the first segment membrane, a positive confluence part of a second electrode assembly is connected to a first conductive part of a second segment membrane, . . . , a positive confluence part 12c of an $(N-2)^{th}$ electrode assembly 10b is connected to a first conductive part of an $(N-2)^{th}$ segment membrane 20c, a negative confluence part 11c of an $(N-1)^{th}$ electrode assembly 10c is connected to a second conductive part of the $(N-2)^{th}$ segment membrane 20c, a positive confluence part 12c of the $(N-1)^{th}$ electrode assembly 10c is connected to a first conductive part of an $(N-1)^{th}$ segment membrane 20d, and a negative confluence part 11d of an $N^{th}$ electrode assembly 10d is connected to a second conductive part of the $(N-1)^{th}$ segment membrane 20d. In the way, the N electrode assemblies can be connected in series, and then a package layer 30 and the segment membranes may be packaged. It can be seen from FIG. 21, the segment membranes 20 divides space in the package layer 30 into N sealing chambers. During connection, the first insulation layer, the second insulation layer, and the third insulation layer of the segment membrane 20 are hermetically connected to the package layer 30 separately, and the segment membrane 20 is hermetically connected to the package layer 30 by using the first insulation layer, the second insulation layer, and the third insulation layer. The segment membrane 20 separates electrolytes in two sealing chambers by using the conductive layer and the third insulation layer. It can be seen by comparison between FIG. 19 and FIG. 21 that, when the structure shown in FIG. 21 is adopted, connection of two adjacent electrode assemblies can be implement by only a conductive layer with a small area, to reduce use of metal materials and reduce production costs.

Figure 22:
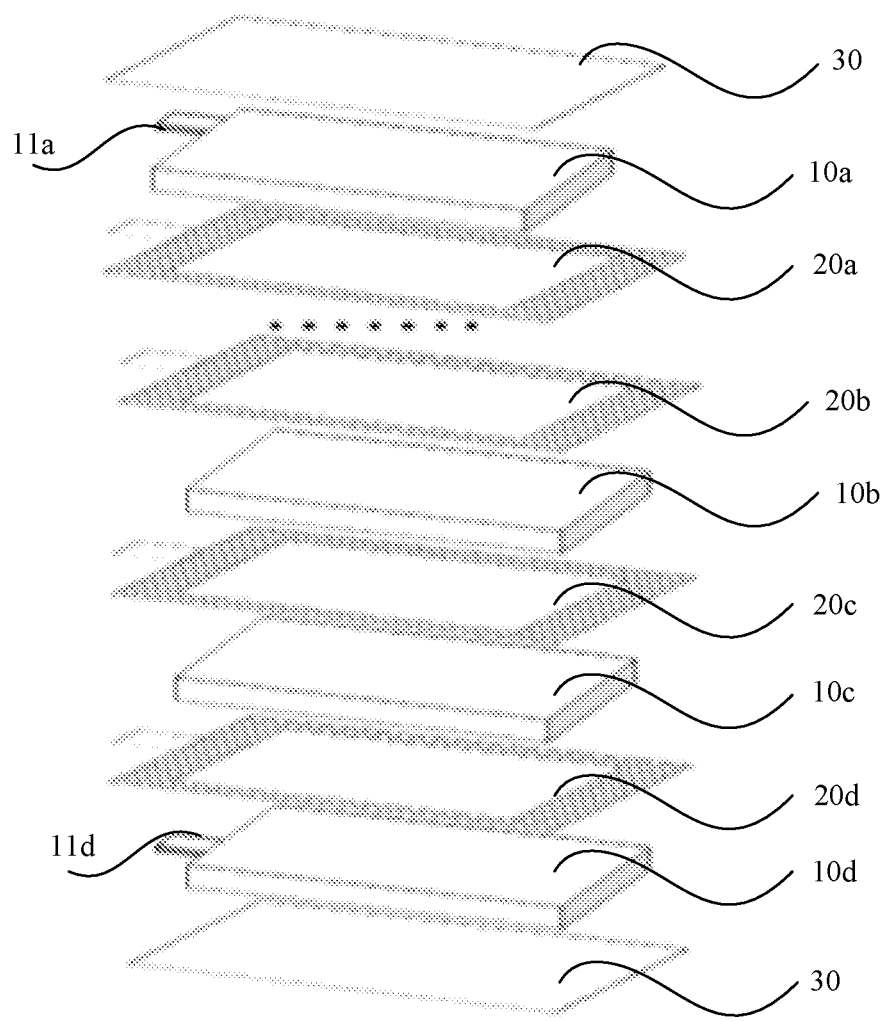
FIG. 22 is a schematic diagram of a battery combination formed by N batteries in parallel by using N−1 segment membranes according to an embodiment of this application.
Figure 23:
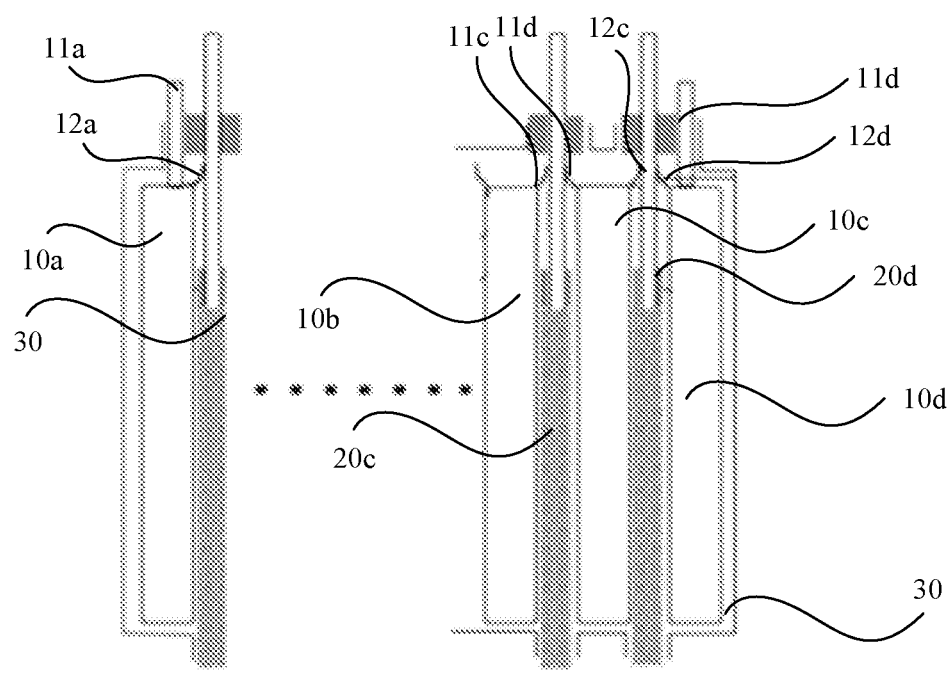
FIG. 23 is a schematic diagram of an internal structure of the battery combination shown in FIG. 22.

FIG. 22 is a schematic diagram of a battery combination formed by N electrode assemblies in parallel by using N−1 segment membranes, and FIG. 23 is a schematic diagram of an internal structure of the battery combination shown in FIG. 22. A positive confluence part 12a of a first electrode assembly 10a is connected to a first conductive part of a first segment membrane 20a, a positive confluence part 12 of a second electrode assembly is connected to a second conductive part of the first segment membrane 20a, a negative confluence part of the second electrode assembly is connected to a first conductive part of a second segment membrane, a negative confluence part of a third electrode assembly is connected to a second conductive part of the second segment membrane, . . . , a negative confluence part 11b of an $(N-2)^{th}$ electrode assembly 10b is connected to a second conductive part of an $(N-2)^{th}$ segment membrane 20c, a negative confluence part 11c of an $(N-1)^{th}$ electrode assembly 10c is connected to a first conductive part of the $(N-2)^{th}$ segment membrane 20c, a positive confluence part 12c of the $(N-1)^{th}$ electrode assembly 10c is connected to a first conductive part of an $(N-1)^{th}$ segment membrane 20d, and a positive confluence part 12d of an $N^{th}$ electrode assembly is connected to a second conductive part of the $(N-1)^{th}$ segment membrane 20d. The N electrode assemblies are connected in parallel, and then a package layer 30 and the segment membranes are packaged. For a specific connection manner of the package layer 30 and the segment membrane 20, refer to related description in FIG. 21.

Figure 24:
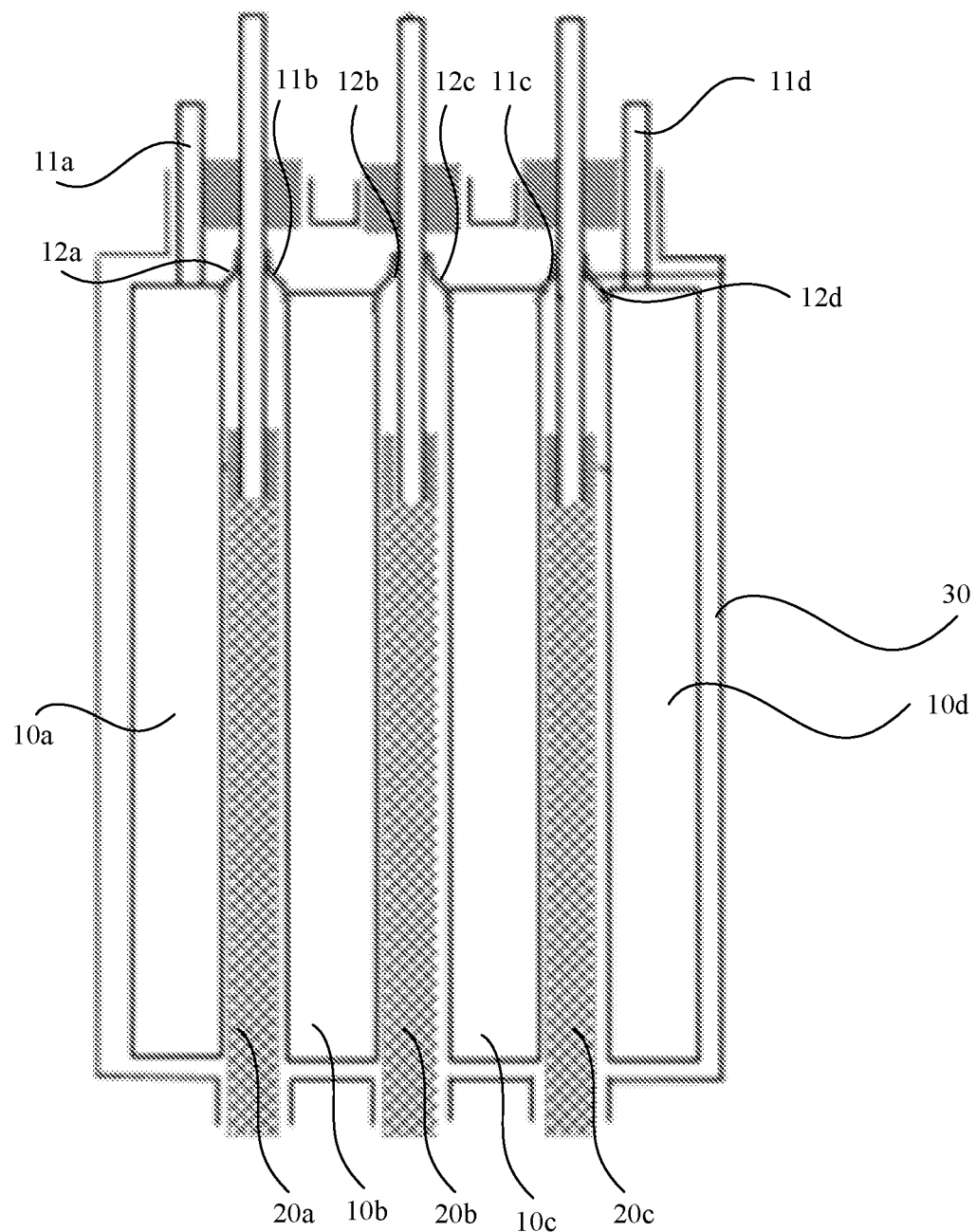
FIG. 24 is a schematic diagram of a battery combination formed by four batteries in series and parallel by using three segment membranes according to an embodiment of this application.

FIG. 24 is a schematic diagram of a battery combination formed by four electrode assemblies in series and parallel by using three segment membranes. A cathode 12a of a first electrode assembly 10a is connected to a first conductive part of a first segment membrane 20a, an anode 11b of a second electrode assembly 10b is connected to a second conductive part of the first segment membrane 20a, a cathode 12b of the second electrode assembly 10b is connected to a first conductive part of a second segment membrane 20b, a cathode 12c of a third electrode assembly 10c is connected to a second conductive part of the second segment membrane 20b, an anode 11c of the third electrode assembly 10c is connected to a second conductive part of a third segment membrane 20c, and a cathode 12d of a fourth electrode assembly 10d is connected to a first conductive part of the third segment membrane 20c. Then, a package layer 30 is packaged with the segment membranes, so that the first electrode assembly 10a and the second electrode assembly 10b can form a series battery combination 1, the third electrode assembly 10c and the fourth electrode assembly 10d form a series battery combination 2, and the serial battery combination 1 and the serial battery combination 2 are connected in parallel. That is, the four electrode assemblies form a series and parallel structure. According to the foregoing technology in which the electrode assembly and the segment membrane forms parallel, serial, and serial and parallel battery combinations, a person skilled in the art can easily use N (N is greater than 2) electrode assemblies and N−1 segment membranes to form a series and parallel battery combination. A connection manner of the confluence parts of the electrode assembly and the first conductive part and the second conductive part of the segment membrane includes: welding the confluence parts of the electrode assembly and the first conductive part and the second conductive part of the segment membrane, bonding them with conductive glue, and riveting them in various forms. For a specific connection manner of the segment membrane and the package layer, refer to related description in FIG. 21.

For ease of understanding a difference between the battery combination provided in this embodiment of this application and the battery combination in the conventional technology, the battery combination provided in this embodiment of this application is compared with the battery combination in the conventional technology.

Figure 25:
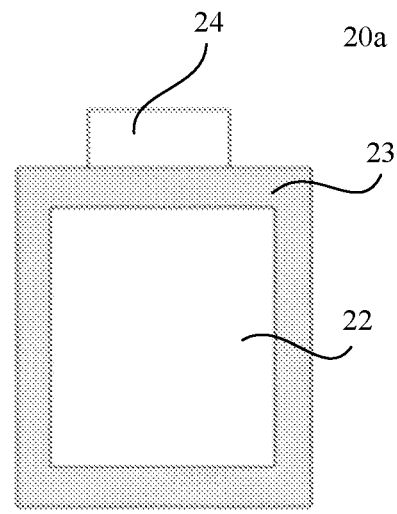
FIG. 25 is a schematic diagram of a structure of a ninth segment membrane according to an embodiment of this application.
Figure 26:
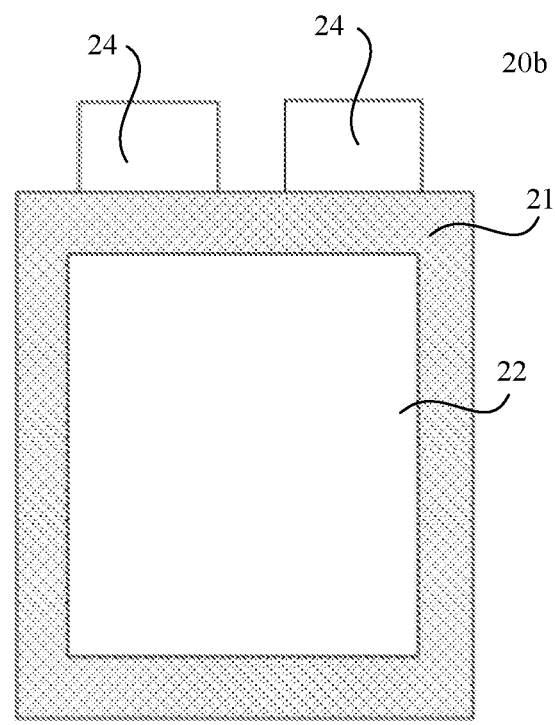
FIG. 26 is a schematic diagram of a structure of a tenth segment membrane according to an embodiment of this application.
Figure 27:
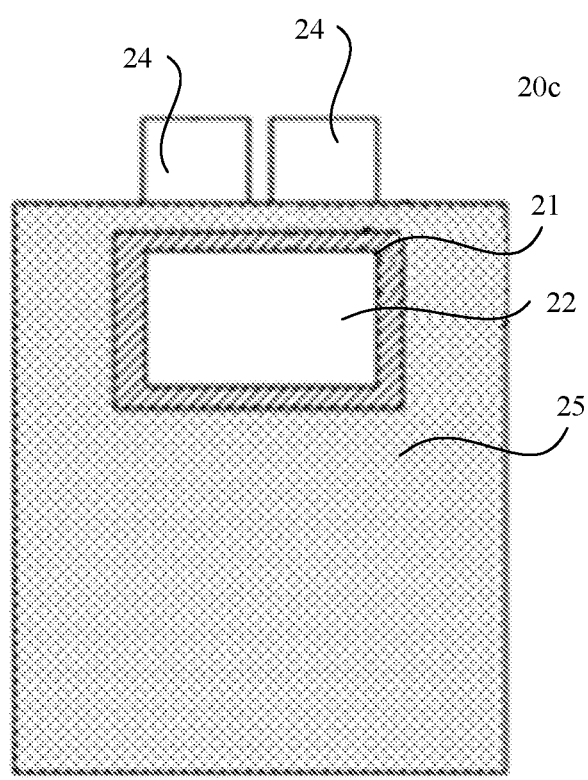
FIG. 27 is a schematic diagram of a structure of an eleventh segment membrane according to an embodiment of this application.

This embodiment of this application provides three types of segment membranes. As shown in FIG. 25, a ninth segment membrane 20a uses a copper layer as a conductive layer 22, a first insulation layer and a second insulation layer are polypropylene layers, and the segment membrane 20a has one third conductive part 24. As shown in FIG. 26, a tenth segment membrane 20b uses an aluminum layer as a conductive layer 22, a first insulation layer and a second insulation layer are polyethylene layers, and the segment membrane 20b has two third conductive parts 24. As shown in FIG. 27, an eleventh segment membrane 20c uses copper/aluminum layer composite foil as a conductive layer 22, a first insulation layer and a second insulation layer are polypropylene layers, a third insulation layer 25 is a copolymer layer of polypropylene and polyethylene, and the segment membrane 20c has two third conductive parts 24.

Figure 28:
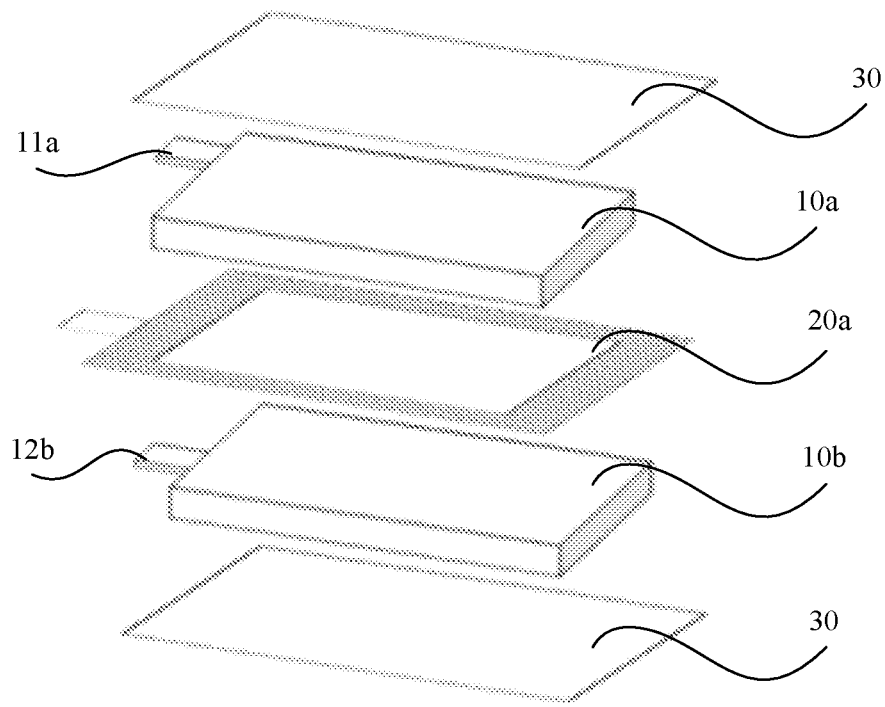
FIG. 28 is a parallel battery combination formed by a ninth segment membrane according to an embodiment of this application.
Figure 29:
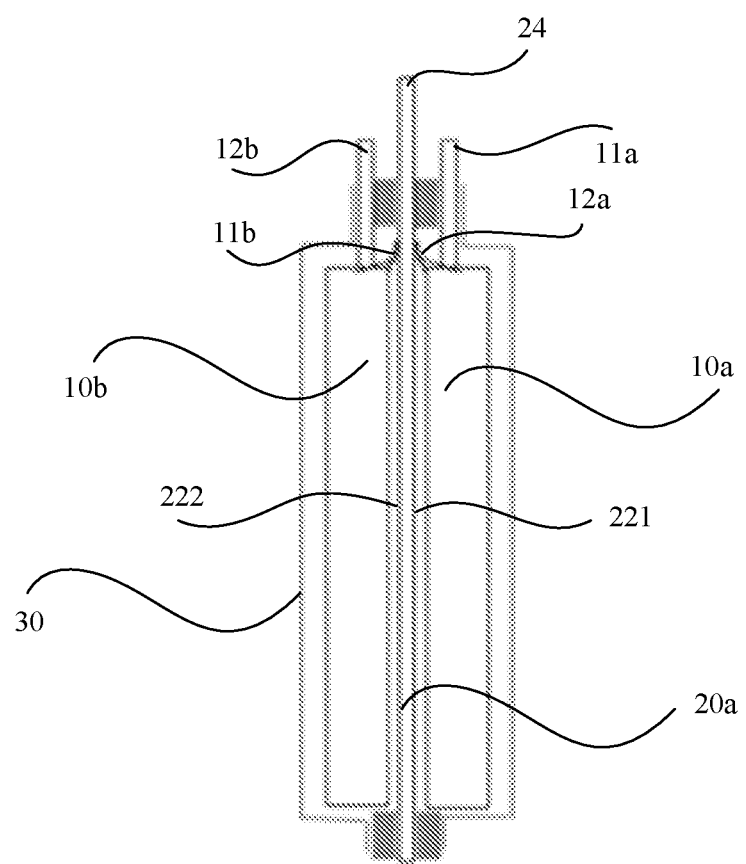
FIG. 29 is a schematic diagram of an internal structure of the battery combination shown in FIG. 28.

FIG. 28 shows a parallel battery combination formed by the segment membrane 20a, and FIG. 29 is a schematic diagram of an internal structure of the battery combination shown in FIG. 28. A positive confluence part 12a of a first electrode assembly 10a is connected to a first conductive part 221 of the segment membrane 20a, and a positive confluence part 12b of a second electrode assembly 10b is connected to a second conductive part 222 of the segment membrane 20a. Then, the electrode assemblies and the segment membrane 20a are packaged by using a package layer 30, to obtain two battery combinations connected in parallel by using the segment membrane 20a. For a specific connection manner of the segment membrane 20a and the package layer 30, refer to related description in FIG. 17.

Figure 30:
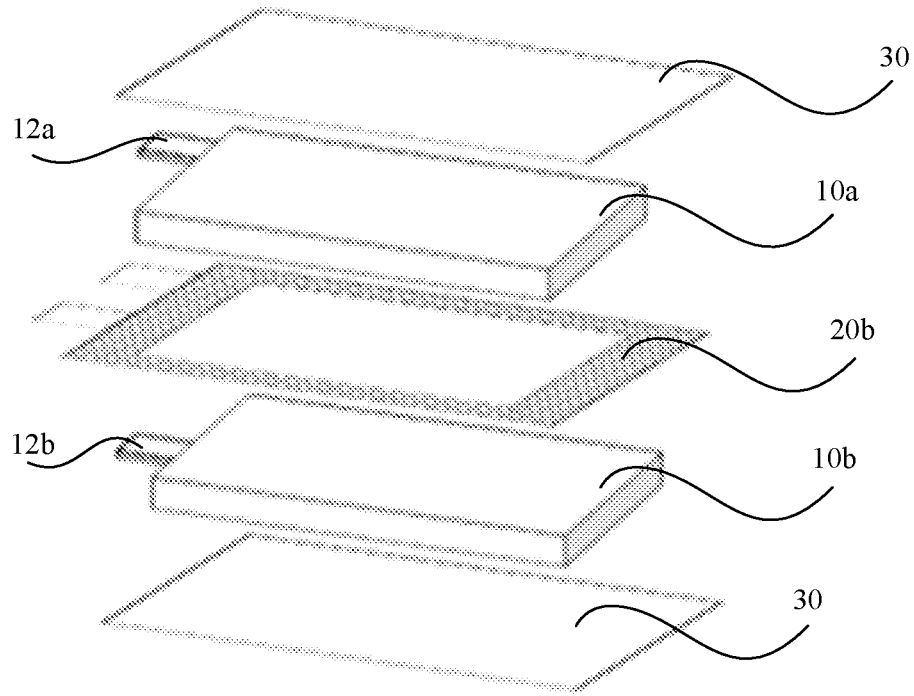
FIG. 30 is a parallel battery combination formed by a tenth segment membrane according to an embodiment of this application.
Figure 31:
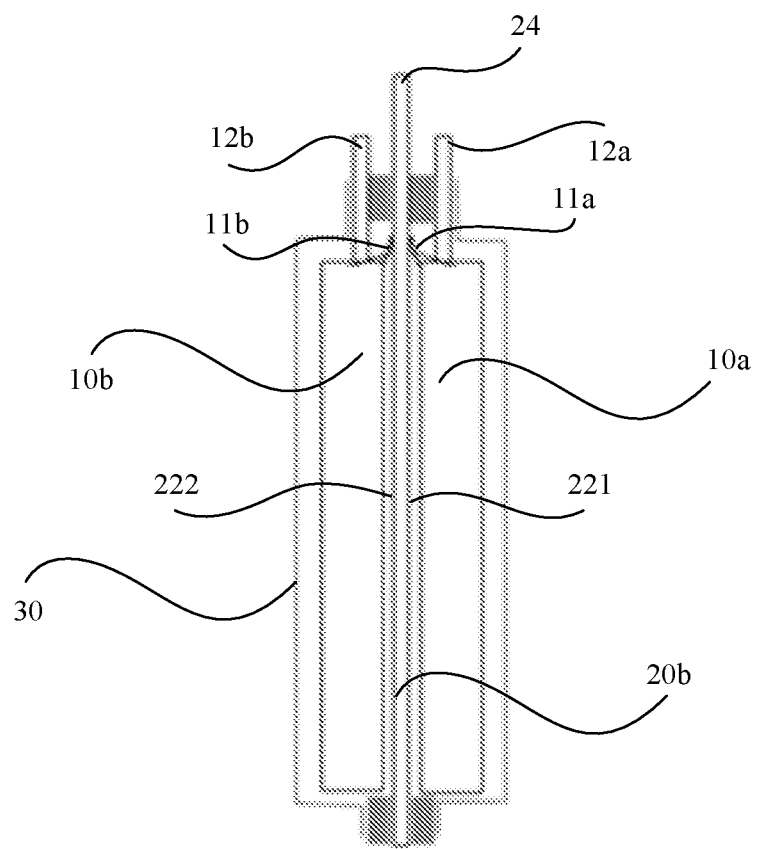
FIG. 31 is a schematic diagram of an internal structure of the battery combination shown in FIG. 30.

FIG. 30 shows a parallel battery combination formed by the segment membrane 20b, and FIG. 31 is a schematic diagram of an internal structure of the battery combination. A negative confluence part 11a of a first electrode assembly 10a is connected to a first conductive part 221 of the segment membrane 20b, and a negative confluence part 11b of a second electrode assembly 10b is connected to a second conductive part 222 of the segment membrane 20b. Then, the electrode assemblies and the segment membrane 20b are packaged by using a package layer 30, to obtain two battery combinations connected in parallel by using the segment membrane 20b. For a specific connection manner of the segment membrane 20b and the package layer 30, refer to related description in FIG. 17.

Figure 32:
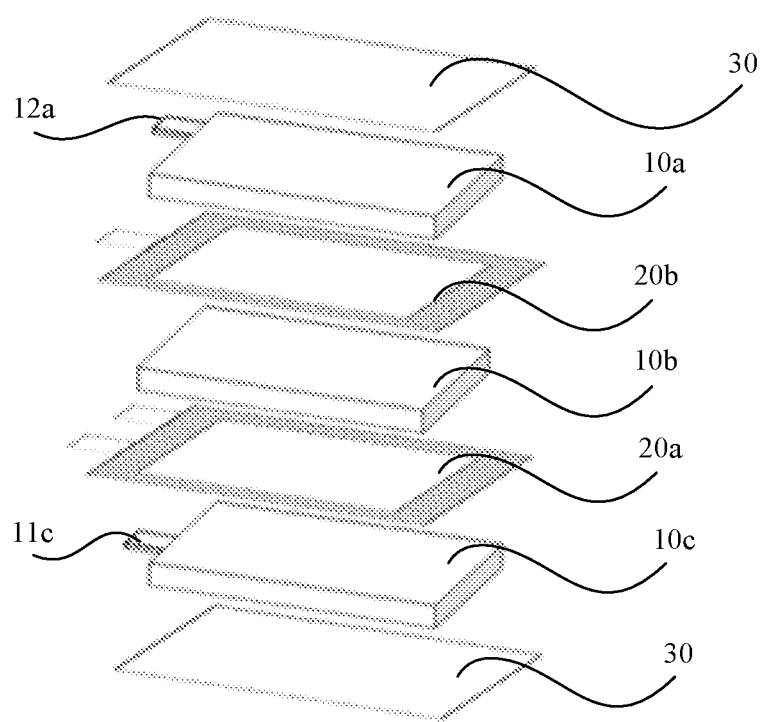
FIG. 32 is a parallel battery combination formed by a ninth segment membrane and a tenth segment membrane according to an embodiment of this application.
Figure 33:
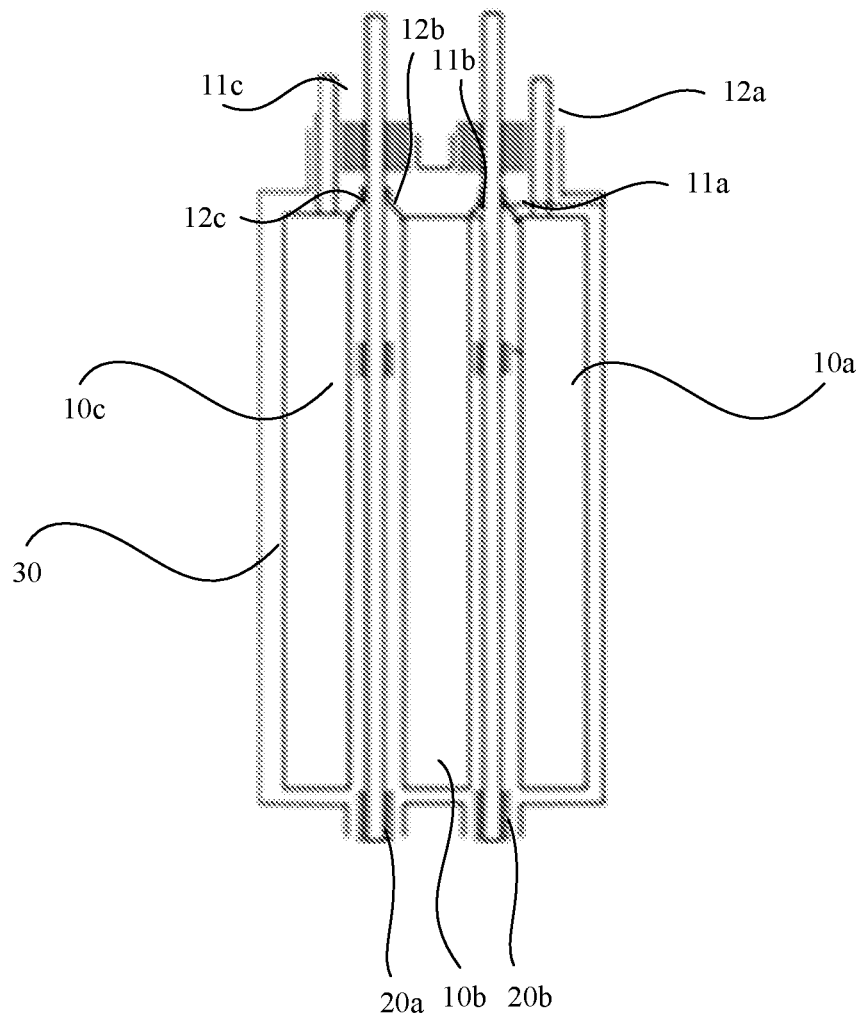
FIG. 33 is a schematic diagram of an internal structure of the battery combination shown in FIG. 32.

FIG. 32 shows a parallel battery combination formed by the segment membrane 20a and the segment membrane 20b, and FIG. 33 is a schematic diagram of an internal structure of the battery combination shown in FIG. 32. A negative confluence part 11a of a first electrode assembly 10a is connected to a first conductive part of the segment membrane 20b, a negative confluence part 11b of a second electrode assembly 10b is connected to a second conductive part of the segment membrane 20b, a positive confluence part 12b of the second electrode assembly 10b is connected to a first conductive part of the segment membrane 20a, and a positive confluence part 12c of a third electrode assembly 10c is connected to a second conductive part of the segment membrane 20a. Then, the electrode assemblies and the segment membranes are packaged by using a package layer 30, and the three electrode assemblies are connected in parallel by using the segment membrane 20a and the segment membrane 20b. For a specific connection manner of the segment membrane 20a, the segment membrane 20b, and the package layer 30, refer to related description in FIG. 17.

Figure 34:
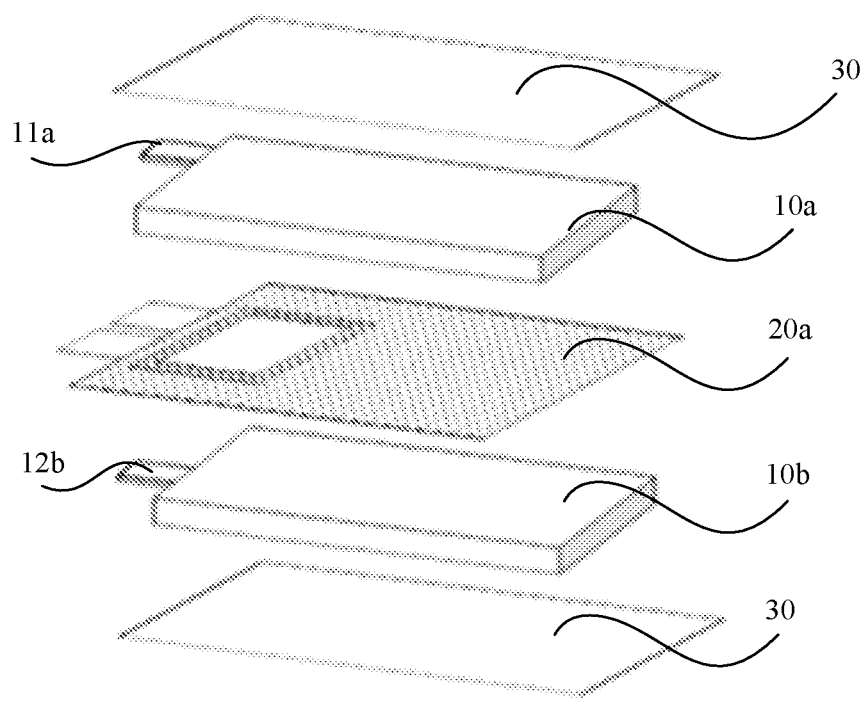
FIG. 34 is a parallel battery combination formed by an eleventh segment membrane according to an embodiment of this application.
Figure 35:
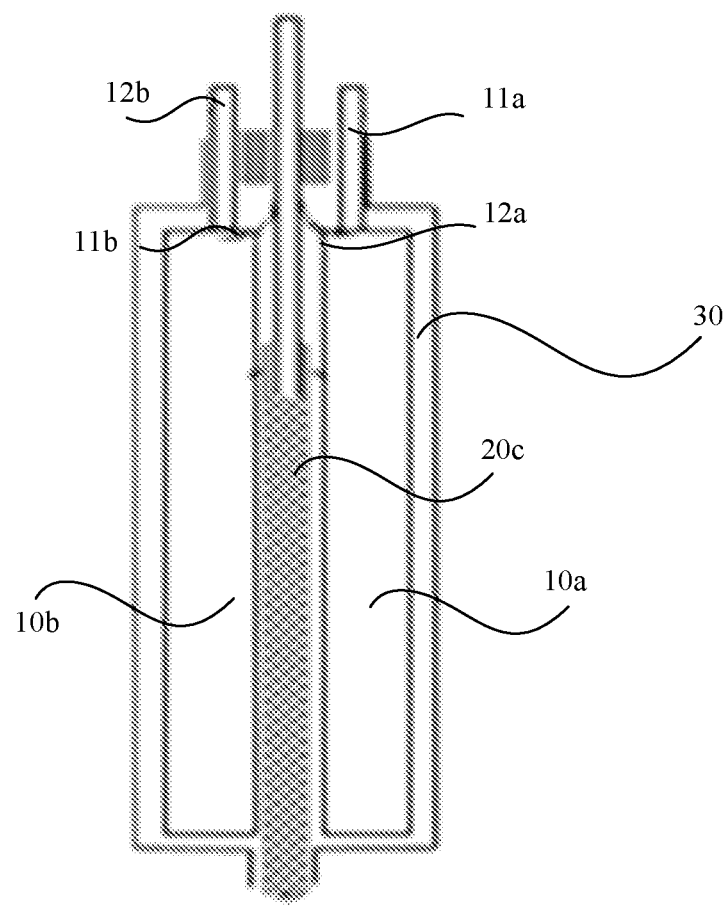
FIG. 35 is a schematic diagram of an internal structure of the battery combination shown in FIG. 34.

FIG. 34 shows a series battery combination formed by the segment membrane 20c, and FIG. 35 is a schematic diagram of an internal structure of the battery combination. A positive confluence part 12a of a first electrode assembly 10a is connected to a first conductive part of the segment membrane 20c, and a negative confluence part 11b of a second electrode assembly 10b is connected to a second conductive part of the segment membrane 20c. Then, the electrode assemblies and the segment membrane are packaged by using a package layer 30, to obtain two battery combinations connected in series by using the segment membrane 20c. For a connection manner of the package layer 30 and the segment membrane 20c, refer to related description in FIG. 21.

Figure 36:
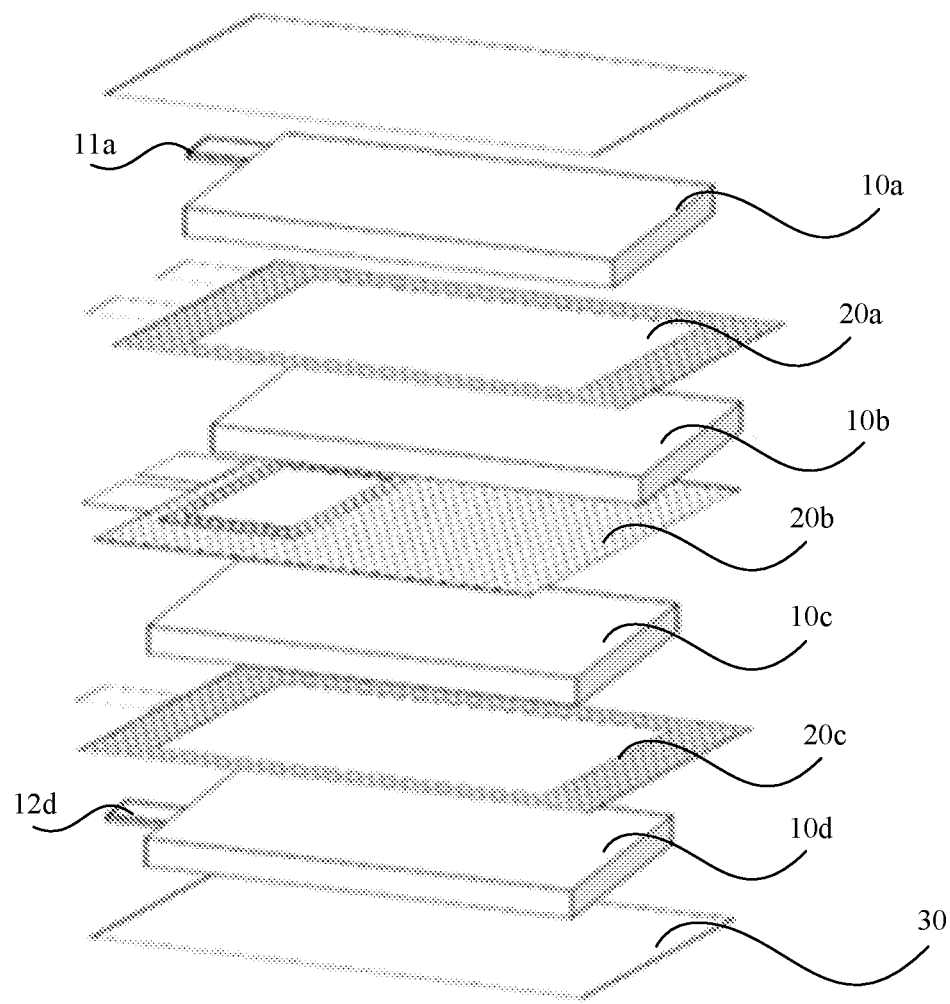
FIG. 36 shows a series and parallel battery combination formed by a ninth segment membrane, a tenth segment membrane, and an eleventh segment membrane according to an embodiment of this application.
Figure 37:
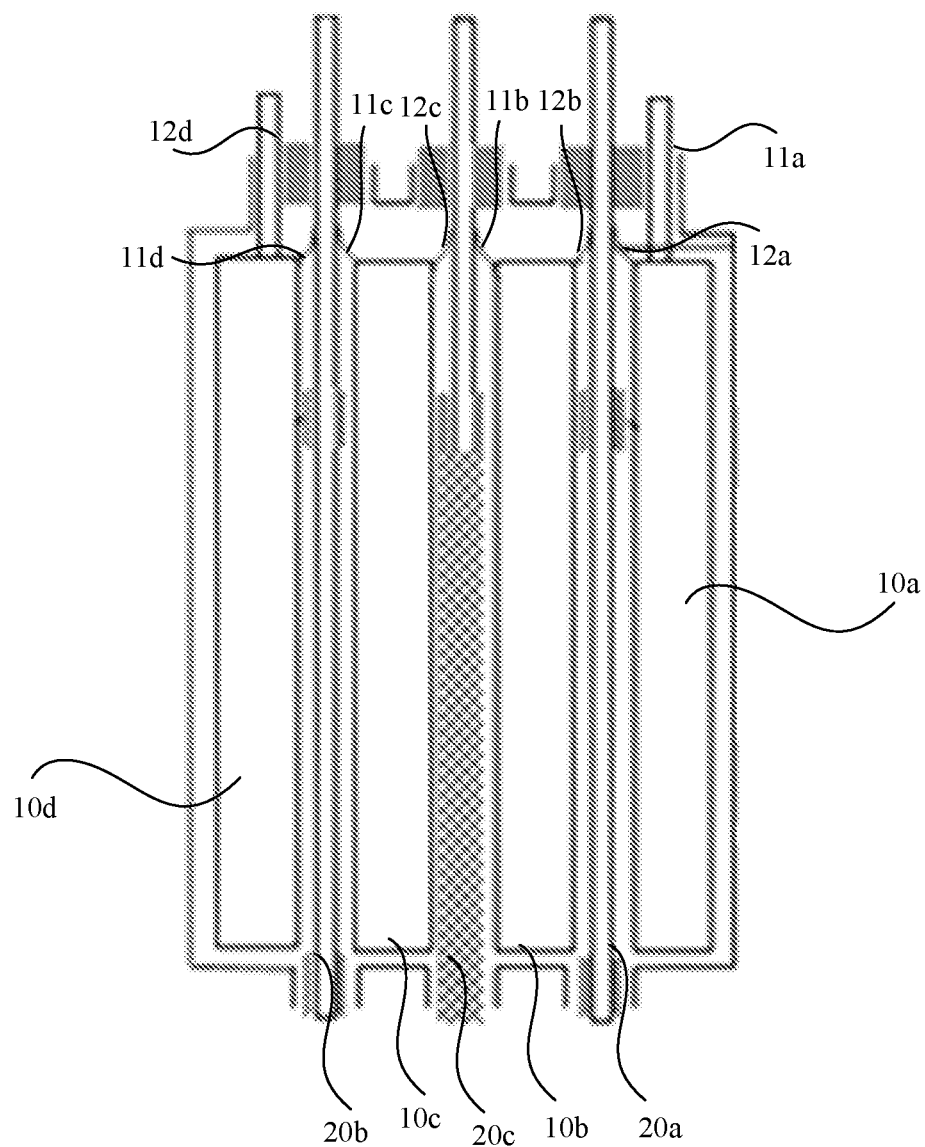
FIG. 37 is a schematic diagram of an internal structure of the battery combination shown in FIG. 36.

FIG. 36 shows a series and parallel battery combination formed by the segment membrane 20a, the segment membrane 20b, and the segment membrane 20c, and FIG. 37 is a schematic diagram of an internal structure of the battery combination. A positive confluence part 12a of a first electrode assembly 10a is connected to a first conductive part of the segment membrane 20a, a positive confluence part 12b of a second electrode assembly 10b is connected to a second conductive part of the segment membrane 20a, a negative confluence part 11b of the second electrode assembly 10b is connected to a first conductive part of the segment membrane 20c, a positive confluence part 12c of a third electrode assembly 10c is connected to a second conductive part of the segment membrane 20c, a negative confluence part 11c of the third electrode assembly 10c is connected to a first conductive part of the segment membrane 20b, and a negative confluence part 11d of a fourth electrode assembly 10d is connected to a second conductive part of the segment membrane 20b. Then, the electrode assemblies and the segment membranes are packaged by using a package layer 30, and the three electrode assemblies are connected in series and parallel by using the segment membrane 20a and the segment membrane 20b. For a connection manner of the segment membrane 20a, the segment membrane 20b, and the package layer 30, refer to related description in FIG. 17. For a connection manner of the package layer 30 and the segment membrane 20c, refer to related description in FIG. 21.

The method and materials for manufacturing the electrode assembly in the comparative embodiment are the same as those in the embodiments. A copper sheet is used as an external electrical connector, and single electrode assemblies in the comparative embodiment are connected in series and/or parallel in a manner as in the embodiment, to form a parallel battery combination 1, a parallel battery combination 2, a parallel battery combination 3, a series battery combination 4, and a series and parallel battery combination 5.

At an ambient temperature of 25° C., the electrode assembly in the comparative embodiment is charged and discharged at a rate of 1 C, discharge energy is extracted from charge and discharge data, and an energy density of the electrode assembly is calculated based on volume of the electrode assembly or the battery combination.

|  | Battery combination | Energy density Wh/L |
|---|---|---|
| Embodiments | Parallel battery combination formed by the segment membrane 20a | 600 |
|  | Parallel battery combination formed by the segment membrane 20b | 600 |
|  | Parallel battery combination formed by the segment membrane 20a and the segment membrane 20b | 590 |
|  | Serial battery combination formed by the segment membrane 20c | 600 |
|  | Serial and parallel battery combination formed by the segment membrane 20a, the segment membrane 20b, | 590 |

|  | Battery combination | Energy density Wh/L |
| --- | --- | --- |
|  | and the segment membrane 20c |  |
| Comparative embodiments | Parallel battery combination 1 | 520 |
|  | Parallel battery combination 2 | 520 |
|  | Parallel battery combination 3 | 510 |
|  | Serial battery combination 4 | 520 |
|  | Serial and parallel battery combination 5 | 490 |

It can be learned from the foregoing description that, in the battery combination provided in embodiments of this application, the electrode assembly is connected by using the segment membrane, and the segment membrane is disposed inside the battery combination, to implement ion insulation and electron conduction between two adjacent electrode assemblies by using the segment membrane. On the basis of implementing a series and/or parallel connection of electrode assemblies, electric connectors and structural components are reduced to a maximum extent, the structure of the battery combination is simplified, the volume of the battery combination is reduced, and the energy density of the battery combination is improved. In addition, the third conductive part is used to implement independent operation and independent control of connected electrode assemblies.

An embodiment of this application further provides an electrical device. The electrical device may be an electric-driven transportation apparatus such as an electric automobile, an electric truck, or an electric ship, or may be a terminal such as a tablet computer, a notebook computer, or a mobile phone. The electrical device includes a housing and the battery combination according to any one of the foregoing. The battery combination is connected to the electrode assembly by using the segment membrane, the segment membrane is disposed inside the battery combination, and ion insulation and electron conduction between two adjacent electrode assemblies are implement by using the segment membrane. On the basis of implementing a series and/or parallel connection of electrode assemblies, electric connectors and structural components are reduced to a maximum extent, the structure of the battery combination is simplified, the volume of the battery combination is reduced, and the energy density of the battery combination is improved. In addition, the third conductive part is used to implement independent operation and independent control of the connected electrode assemblies.

The foregoing description is merely a specific implementation of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A segment membrane for electrical connection and isolation between electrode assemblies in a battery combination, wherein the segment membrane comprises a conductive layer, a first insulation layer, and a second insulation layer that are disposed in a laminated manner, wherein the conductive layer is located between the first insulation layer and the second insulation layer, and wherein:
the conductive layer comprises a first conductive part and a second conductive part that are disposed in a laminated manner and electrically connected;
the first insulation layer is a first frame structure disposed on a surface of the first conductive part and away from the second conductive part;
the second insulation layer is a second frame structure disposed on a surface of the second conductive part and away from the first conductive part;
the battery combination comprises a package layer;
the segment membrane is configured to separate the package layer into sealing chambers; and
the segment membrane further comprising a third conductive part, wherein the third conductive part is respectively in electrical connection with the first conductive part and the second conductive part, and the third conductive part extends outside the sealing chambers.

2. The segment membrane according to claim 1, wherein an outer frame edge of the first insulation layer is disposed along an edge of the first conductive part, and wherein an outer frame edge of the second insulation layer is disposed along an edge of the second conductive part.

3. The segment membrane according to claim 1, wherein an inner frame edge of the first insulation layer is a rectangle, a circle, an ellipse, or a special shape, and wherein an inner frame edge of the second insulation layer is a rectangle, a circle, an ellipse, or a special shape.

4. The segment membrane according to claim 1, wherein the first conductive part comprises one or more materials of copper, aluminum, nickel, iron, or carbon, and wherein the second conductive part comprises one or more materials of copper, aluminum, nickel, iron, or carbon.

5. The segment membrane according to claim 1, wherein the conductive layer further comprises a connection layer, and the first conductive part and the second conductive part are electrically connected by using the connection layer.

6. The segment membrane according to claim 1, further comprising a third insulation layer, wherein the third insulation layer at least partially wraps a sidewall of the conductive layer.

7. The segment membrane according to claim 6, wherein the third insulation layer, the first insulation layer, and the second insulation layer are an integral structure.

8. The segment membrane according to claim 1, wherein the third conductive part is used to connect to an external circuit or serve as a detection point of the battery combination.

9. The segment membrane according to claim 8, wherein the third conductive part is used for electric potential measurement or capacity equalization adjustment of the battery combination.

10. The segment membrane according to claim 1, wherein the segment membrane comprises a third insulation layer, and wherein the third conductive part is exposed outside the third insulation layer.

11. A battery combination, comprising a package layer, N electrode assemblies, and N−1 segment membranes, wherein:
N is a positive integer greater than or equal to 2;
the N−1 segment membranes separate the package layer into N sealing chambers, the N electrode assemblies are disposed one by one in the N sealing chambers, and each electrode assembly is electrically connected to an adjacent segment membrane;
each sealing chamber is filled with an electrolyte, and a segment membrane is used to isolate electrolytes in adjacent sealing chambers;
the segment membrane is used for electrical connection and isolation between electrode assemblies in the battery combination, wherein the segment membrane comprises a conductive layer, a first insulation layer, and a second insulation layer that are disposed in a laminated manner, and the conductive layer is located between the first insulation layer and the second insulation layer;

the conductive layer comprises a first conductive part and a second conductive part that are disposed in a laminated manner and electrically connected;

the first insulation layer is a first frame structure disposed on a surface of the first conductive part and away from the second conductive part;

the second insulation layer is a second frame structure disposed on a surface of the second conductive part and away from the first conductive part; and the segment membrane further comprising a third conductive part, wherein the third conductive part is respectively in electrical connection with the first conductive part and the second conductive part, and the third conductive part extends outside the sealing chambers.

12. The battery combination according to claim 11, wherein the segment membrane isolates the electrolytes in the adjacent sealing chambers by using the conductive layer.

13. The battery combination according to claim 12, wherein the segment membrane is hermetically connected to the package layer by using the first insulation layer and the second insulation layer.

14. The battery combination according to claim 11, wherein the segment membrane isolates the electrolytes in the adjacent sealing chambers by using the conductive layer and a third insulation layer.

15. The battery combination according to claim 14, wherein the segment membrane is hermetically connected to the package layer by using the first insulation layer, the second insulation layer, and the third insulation layer.

16. The battery combination according to claim 11, wherein the N electrode assemblies are connected in series or in parallel by using the N−1 segment membranes.

17. The battery combination according to claim 11, wherein the N electrode assemblies are connected in series and parallel by using the N−1 segment membranes.

18. An electrical device, comprising a housing and a battery combination disposed in the housing, wherein:

the battery combination comprises a package layer, N electrode assemblies, and N−1 segment membranes, wherein N is a positive integer greater than or equal to 2;

the N−1 segment membranes separate the package layer into N sealing chambers, the N electrode assemblies are disposed one by one in the N sealing chambers, and each electrode assembly is electrically connected to an adjacent segment membrane;

each sealing chamber is filled with an electrolyte, and a segment membrane is used to isolate electrolytes in adjacent sealing chambers;

the segment membrane is used for electrical connection and isolation between electrode assemblies in the battery combination, wherein the segment membrane comprises a conductive layer, a first insulation layer, and a second insulation layer that are disposed in a laminated manner, and the conductive layer is located between the first insulation layer and the second insulation layer;

the conductive layer comprises a first conductive part and a second conductive part that are disposed in a laminated manner and electrically connected;

the first insulation layer is a first frame structure disposed on a surface of the first conductive part and away from the second conductive part;

the second insulation layer is a second frame structure disposed on a surface of the second conductive part and away from the first conductive part; and the segment membrane further comprising a third conductive part, wherein the third conductive part is respectively in electrical connection with the first conductive part and the second conductive part, and the third conductive part extends outside the sealing chambers.

19. The electrical device according to claim 18, wherein the segment membrane isolates the electrolytes in the adjacent sealing chambers by using the conductive layer.

20. The electrical device according to claim 18, wherein the segment membrane further comprising a third insulation layer, wherein the third insulation layer at least partially wraps a sidewall of the conductive layer.

* * * * *